(12) United States Patent  
Haga et al.

(10) Patent No.: US 7,840,094 B2  
(45) Date of Patent: Nov. 23, 2010

(54) IMAGE PROCESSING APPARATUS AND METHOD, AND RECORDING MEDIUM HAVING A PROGRAM RECORDED THEREIN

(75) Inventors: Tsugihiko Haga, Kanagawa (JP); Tetsujiro Kondo, Tokyo (JP); Daisuke Kikuchi, Tokyo (JP); Shizuo Chikaoka, Tokyo (JP); Takeshi Miyai, Tokyo (JP); Takashi Nakanishi, Tokyo (JP); Yoshiaki Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 1065 days.

(21) Appl. No.: 11/224,979

(22) Filed: Sep. 14, 2005

(65) Prior Publication Data

US 2006/0062477 A1 Mar. 23, 2006

(30) Foreign Application Priority Data

Sep. 22, 2004 (JP) ............................. 2004-274798

(51) Int. Cl.
*G06K 9/62* (2006.01)
*G06K 9/00* (2006.01)
*G06K 9/46* (2006.01)
*G06K 9/40* (2006.01)
*G06K 9/32* (2006.01)
*H04N 7/01* (2006.01)
*H04N 9/74* (2006.01)

(52) U.S. Cl. .................. 382/298; 382/155; 382/181; 382/243; 382/261; 382/275; 348/441; 348/581

(58) Field of Classification Search ............... 382/224, 382/242–243, 298–300
See application file for complete search history.

(56) References Cited

U.S. PATENT DOCUMENTS

| 5,754,693 | A  | * | 5/1998 | Takesue et al. ............... 382/224 |
| 5,754,710 | A  | * | 5/1998 | Sekine et al. ............... 382/300 |
| 6,185,336 | B1 | * | 2/2001 | Clark et al. ................. 382/224 |
| 7,233,364 | B2 | * | 6/2007 | Kondo et al. ................ 348/458 |
| 2002/0122596 | A1 | * | 9/2002 | Bradshaw .................... 382/226 |

(Continued)

FOREIGN PATENT DOCUMENTS

JP 7-50752 2/1995

(Continued)

*Primary Examiner*—Vu Le
*Assistant Examiner*—Nathan Bloom
(74) *Attorney, Agent, or Firm*—Oblon, Spivak, McClelland, Maier & Neustadt, L.L.P.

(57) ABSTRACT

An image processing apparatus and method, and a program-recorded recording medium perform detecting features of image information for classes which is input for learning, calculating the degrees of belongingness of the detected features to the classes, weighting pieces of the input image information based on the degrees of belongingness, and calculating prediction coefficients for the classes based on the weighted pieces of the image information. The apparatus and method, and program-recorded recording medium also perform detecting features of input image information for classes, calculating the degrees of belongingness of the detected features to the classes, weighting pieces of the input image information based on the degrees of belongingness, providing prediction coefficients for the classes, calculating pieces of predictive image information for the classes based on the weighted pieces of the image information and the provided coefficients for the classes, and adding the pieces of predictive image information for the classes.

23 Claims, 17 Drawing Sheets

U.S. PATENT DOCUMENTS

| | | | |
|---|---|---|---|
| 2002/0191104 A1* | 12/2002 | Matsutani et al. | 348/441 |
| 2003/0044087 A1* | 3/2003 | Kondo et al. | 382/298 |
| 2003/0128877 A1* | 7/2003 | Nicponski | 382/224 |
| 2004/0051799 A1* | 3/2004 | Yamanaka | 348/272 |
| 2005/0078874 A1* | 4/2005 | Buccigrossi et al. | 382/240 |
| 2005/0122426 A1* | 6/2005 | Winger et al. | 348/452 |
| 2005/0180654 A1* | 8/2005 | Zhu | 382/269 |
| 2006/0078205 A1* | 4/2006 | Porikli et al. | 382/204 |
| 2007/0172152 A1* | 7/2007 | Altunbasak et al. | 382/300 |

FOREIGN PATENT DOCUMENTS

| | | | |
|---|---|---|---|
| JP | 7-75066 | | 3/1995 |
| JP | 09172621 | A * | 6/1997 |
| JP | 11-15969 | | 1/1999 |

* cited by examiner

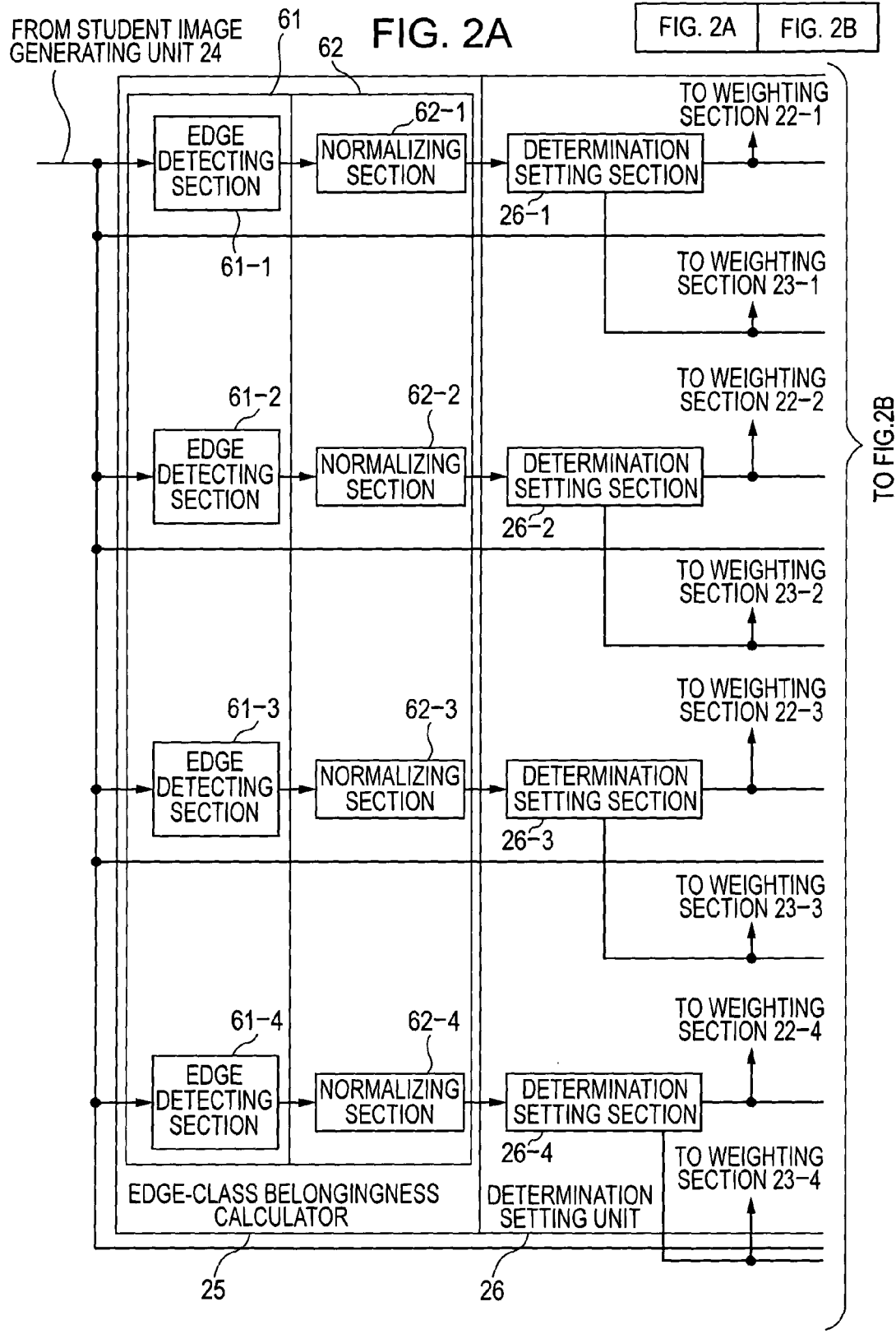

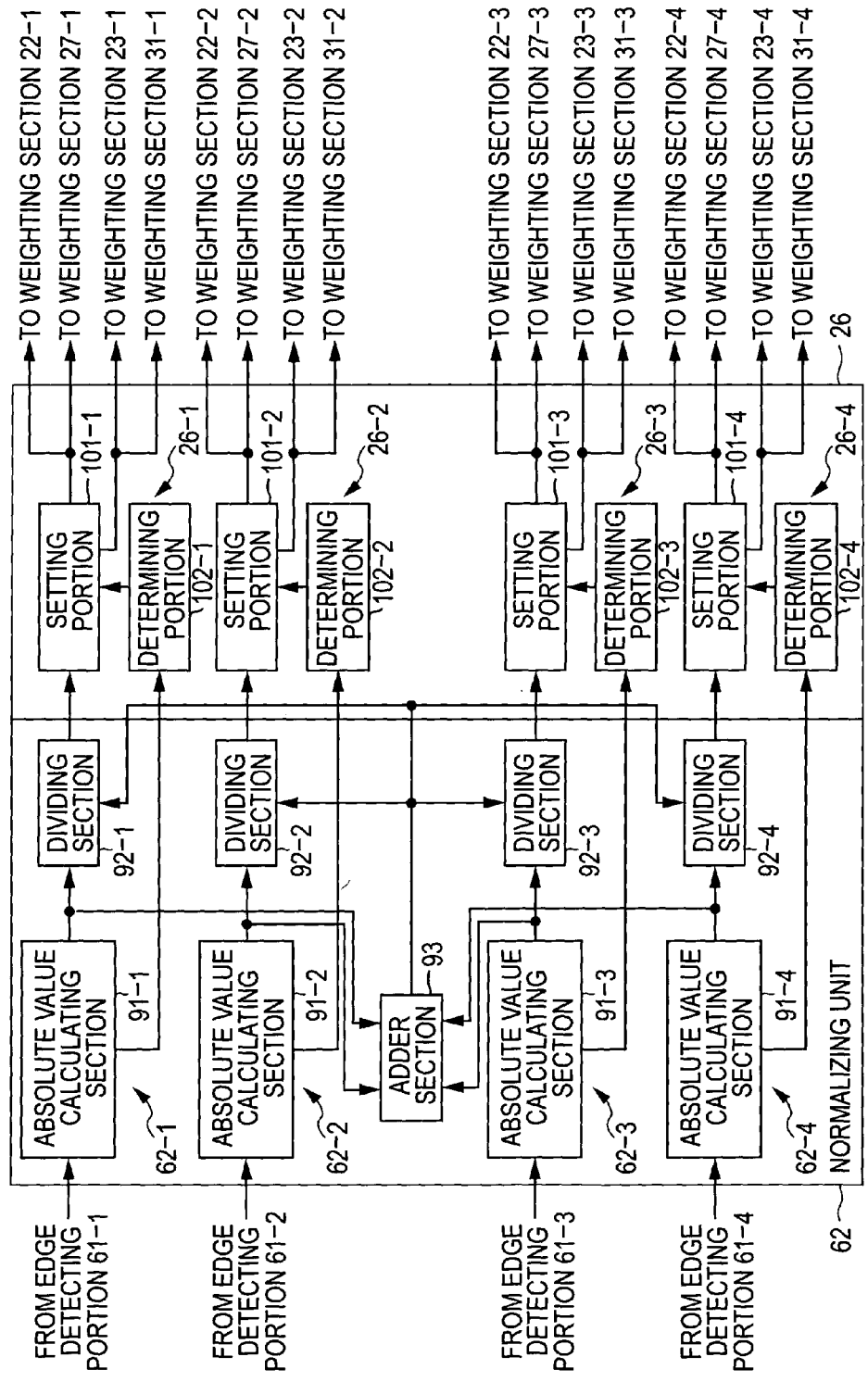

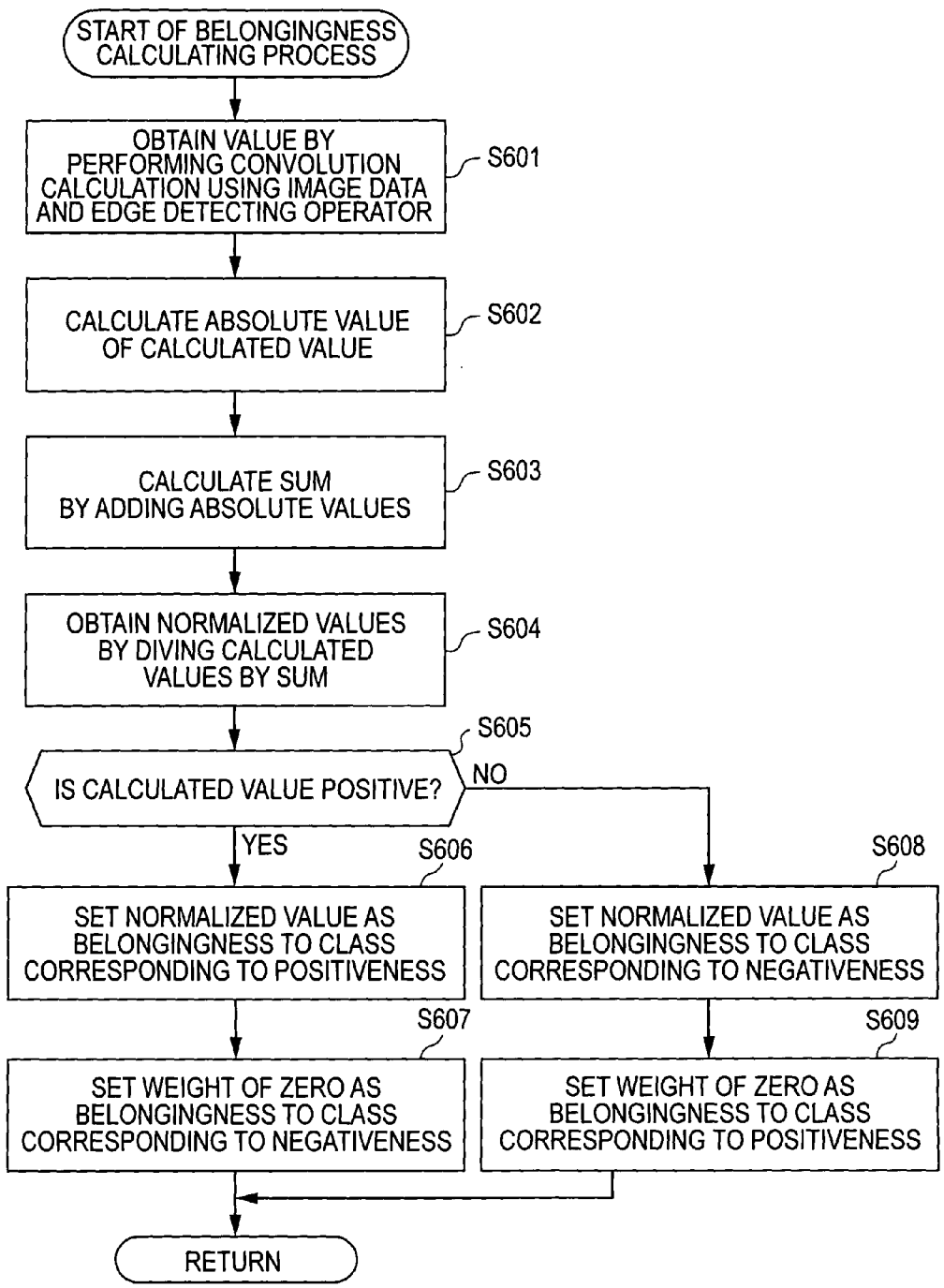

HORIZONTAL EDGE

VERTICAL EDGE

UPWARD-SLOPING EDGE

DOWNWARD-SLOPING EDGE

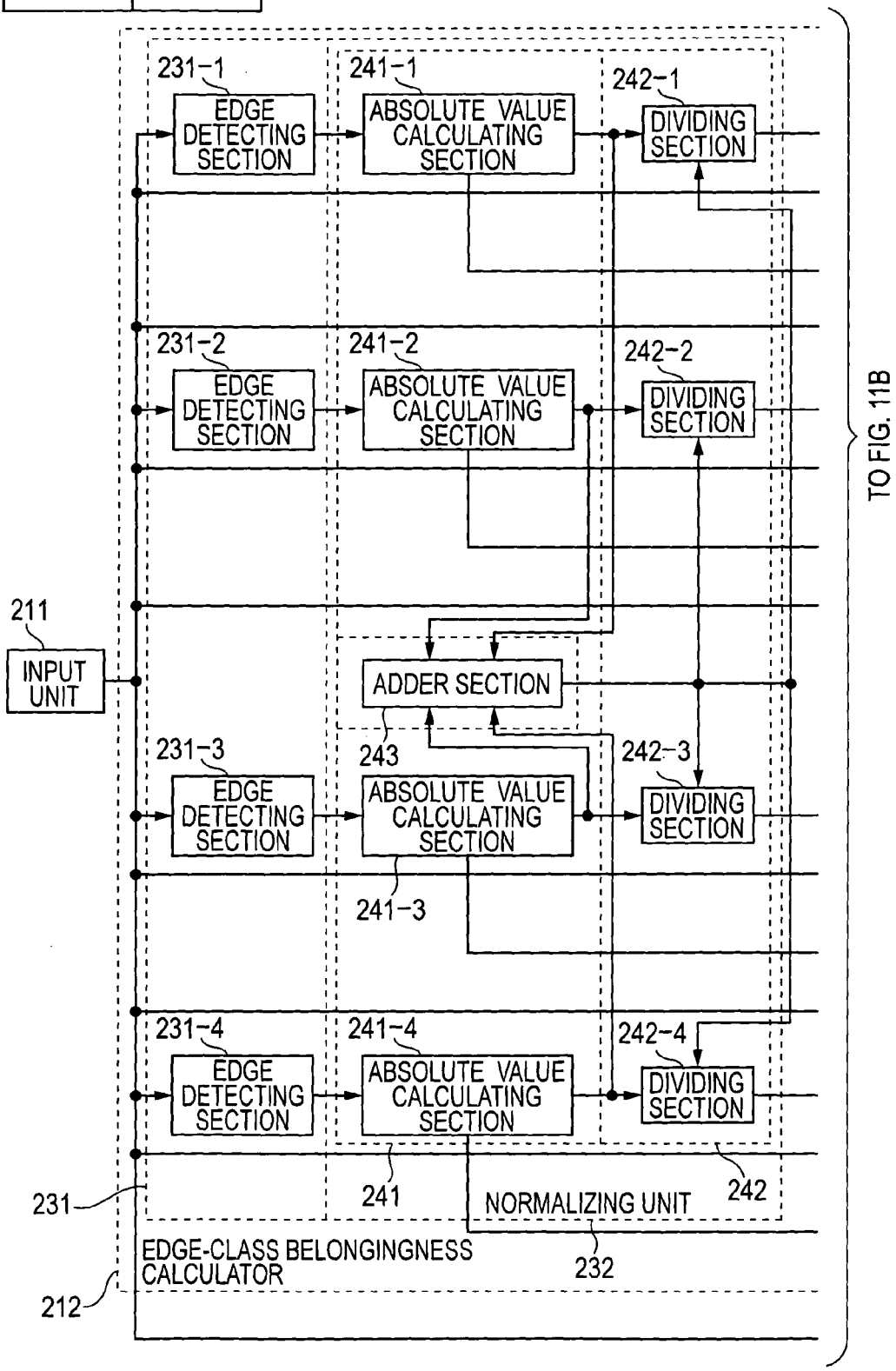

FIG. 13A

| $\frac{-1}{8}$ | $\frac{-1}{8}$ | $\frac{-1}{8}$ | $\frac{-1}{8}$ | $\frac{-1}{8}$ |
|---|---|---|---|---|
| $\frac{-3}{8}$ | $\frac{-3}{8}$ | $\frac{-3}{8}$ | $\frac{-3}{8}$ | $\frac{-3}{8}$ |
| 1.0 | 1.0 | 1.0 | 1.0 | 1.0 |
| $\frac{-3}{8}$ | $\frac{-3}{8}$ | $\frac{-3}{8}$ | $\frac{-3}{8}$ | $\frac{-3}{8}$ |
| $\frac{-1}{8}$ | $\frac{-1}{8}$ | $\frac{-1}{8}$ | $\frac{-1}{8}$ | $\frac{-1}{8}$ |

FIG. 13B

| $\frac{-1}{8}$ | $\frac{-3}{8}$ | 1.0 | $\frac{-3}{8}$ | $\frac{-1}{8}$ |
|---|---|---|---|---|
| $\frac{-1}{8}$ | $\frac{-3}{8}$ | 1.0 | $\frac{-3}{8}$ | $\frac{-1}{8}$ |
| $\frac{-1}{8}$ | $\frac{-3}{8}$ | 1.0 | $\frac{-3}{8}$ | $\frac{-1}{8}$ |
| $\frac{-1}{8}$ | $\frac{-3}{8}$ | 1.0 | $\frac{-3}{8}$ | $\frac{-1}{8}$ |
| $\frac{-1}{8}$ | $\frac{-3}{8}$ | 1.0 | $\frac{-3}{8}$ | $\frac{-1}{8}$ |

FIG. 13C

| 0.0 | 0.0 | $\frac{-3}{8}$ | $\frac{-5}{8}$ | 1.0 |
|---|---|---|---|---|
| 0.0 | $\frac{-1}{8}$ | $\frac{-3}{8}$ | 1.0 | $\frac{-4}{8}$ |
| $\frac{-1}{8}$ | $\frac{-3}{8}$ | 1.0 | $\frac{-3}{8}$ | $\frac{-1}{8}$ |
| $\frac{-4}{8}$ | 3.0 | $\frac{-3}{8}$ | $\frac{-1}{8}$ | 0.0 |
| 1.0 | $\frac{-5}{8}$ | $\frac{-3}{8}$ | 0.0 | 0.0 |

FIG. 13D

| 1.0 | $\frac{-5}{8}$ | $\frac{-3}{8}$ | 0.0 | 0.0 |
|---|---|---|---|---|
| $\frac{-4}{8}$ | 1.0 | $\frac{-3}{8}$ | $\frac{-1}{8}$ | 0.0 |
| $\frac{-1}{8}$ | $\frac{-3}{8}$ | 1.0 | $\frac{-3}{8}$ | $\frac{-1}{8}$ |
| 0.0 | $\frac{-1}{8}$ | $\frac{-3}{8}$ | 1.0 | $\frac{-4}{8}$ |
| 0.0 | 0.0 | $\frac{-3}{8}$ | $\frac{-5}{8}$ | 1.0 |

$\sigma=0, \theta=0$

σ=1, θ=0

σ=2, θ=0

IMAGE PROCESSING APPARATUS AND METHOD, AND RECORDING MEDIUM HAVING A PROGRAM RECORDED THEREIN

CROSS REFERENCES TO RELATED APPLICATIONS

The present invention contains subject matter related to Japanese Patent Application JP 2004-274798 filed in the Japanese Patent Office on Sep. 22, 2004, the entire contents of which are incorporated herein by reference.

BACKGROUND OF THE INVENTION

1. Field of the Invention

The present invention relates to image processing apparatuses and methods, and recording media having programs recorded therein. In particular, the present invention relates to an image processing apparatus and method that obtain high quality image information by performing a reduced number of arithmetic operations, and to a recording medium having a program recorded therein.

2. Description of the Related Art

The assignee of the present invention has already proposed a technology (see, for example, Japanese Unexamined Patent Application Publication No. 9-172621) in which a high resolution image is generated by using classification adaptive processing. In this proposed technology, the level of each pixel in each block having 3×3 pixels is binarized such that it is compared with the average of the levels of the pixels in the block, and the binarized level is compressed to four bits.

In addition, edges in horizontal and vertical directions are detected (2 bits for each), and, based on a total of eight bits of the edges (4 bits in total) and a level distribution pattern (4 bits), a class to which the block belongs is determined.

However, in the proposed technology, each input block having 3×3 pixels is necessarily classified into a single class. This results in a problem in that, when a class tap range is narrow, classes are mixed to cause deterioration in quality of a predictive image.

Conversely, when a broad class tap is used, a problem occurs in that the number of classes exponentially increases, so that it is difficult to obtain learning samples for obtaining coefficients for the classes.

SUMMARY OF THE INVENTION

The present invention has been made in view of such circumstances. It is desirable to obtain an improved quality image without increasing the number of classes.

A first image processing apparatus according to an embodiment of the present invention includes a feature detecting unit which detects features of image information for a plurality of classes, the image information being input for learning, a belongingness calculating unit which calculates the degrees of belongingness of the detected features to the classes, a weighting unit which weights pieces of the input image information based on the degrees of belongingness, and a prediction coefficient calculating unit which calculates prediction coefficients for the classes based on the weighted pieces of the image information.

The feature detecting unit may detect a feature of a first image-information portion in the input image information. The belongingness calculating unit may calculate the degrees of belongingness of the feature of the first image-information portion to the classes. Based on the calculated degrees of belongingness, the weighting unit may weight the first image-information portion and a second image-information portion in the input image information, the second image-information portion representing image quality higher than image quality represented by the first image-information portion. The prediction coefficient calculating unit may calculate the prediction coefficients for the classes by solving sum matrices to each of which the weighted first and second image-information portions are added.

The feature detecting unit may detect, as the features of the image information for the classes, edge components of the image information in a plurality of predetermined directions.

The feature detecting unit may detect the edge components by convoluting edge detecting operators for the directions with the image information.

The image processing apparatus may further includes a determination setting unit which determines the polarities of the detected edge components, and in which, based on the determined polarities, weights based on the degrees of belongingness are set as weights for, among the plurality of classes, a group of classes corresponding to the edge detecting operators, and zeroes are set as weights for another group of classes.

The feature detecting unit may detect the edge components by convoluting, with the image information, a two-dimensional wavelet function having a plurality of different parameters set therein.

The feature detecting unit may detect the edge components in four directions which are used as the predetermined directions and which include a horizontal direction, a vertical direction, a 45-degree upward-sloping direction, and a 45-degree downward-sloping direction.

The belongingness calculating unit may include an absolute value calculating unit which calculates the absolute values of the edge components, a summation calculating unit which calculates the sum of the absolute values of the edge components, and a division unit which divides each of the edge components by the calculated sum.

The image processing apparatus may further include a storage unit for storing the prediction coefficients.

A first information processing method according to an embodiment of the present invention includes the steps of detecting features of image information for a plurality of classes, the image information being input for learning, calculating the degrees of belongingness of the detected features to the classes, weighting pieces of the input image information based on the degrees of belongingness, and calculating prediction coefficients for the classes based on the weighted pieces of the image information.

A first recording medium according to an embodiment of the present invention has a computer-readable program recorded therein. The program including the steps of detecting features of image information for a plurality of classes, the image information being input for learning, calculating the degrees of belongingness of the detected features to the classes, weighting pieces of the input image information based on the degrees of belongingness, and calculating prediction coefficients for the classes based on the weighted pieces of the image information.

A second image processing apparatus according to an embodiment of the present invention includes a feature detecting unit which detects features of input image information for a plurality of classes, a belongingness calculating unit which calculates the degrees of belongingness of the detected features to the classes, a weighting unit which weights pieces of the input image information based on the degrees of belongingness, a providing unit which provides prediction coefficients for the classes, and a predictive-image-information calculating unit which calculates pieces of predictive image information for the classes on the basis of the weighted pieces of the image information and the provided prediction coefficients for the classes, and an adder unit which adds the pieces of the predictive image information for the classes.

The feature detecting unit may detect, as the features of the image information for the classes, edge components of the image information in a plurality of predetermined directions.

The feature detecting unit may detect the edge components by convoluting edge detecting operators for the directions with the image information.

The second image processing apparatus may further include a determination setting unit which determines the polarities of the detected edge components, and in which, based on the determined polarities, weights based on the degrees of belongingness are set as weights for, among the plurality of classes, a group of classes corresponding to the edge detecting operators, and zeroes are set as weights for another group of classes.

The feature detecting unit may detect the edge components by convoluting, with the image information, a two-dimensional wavelet function having a plurality of different parameters set therein.

The feature detecting unit may detect the edge components in four directions which are used as the predetermined directions and which include a horizontal direction, a vertical direction, a 45-degree upward-sloping direction, and a 45-degree downward-sloping direction.

The belongingness calculating unit may include an absolute value calculating unit which calculates the absolute values of the edge components, a summation calculating unit which calculates the sum of the absolute values of the edge components, and a division unit which divides each of the edge components by the calculated sum.

The providing unit may store the prediction coefficients beforehand.

A second information processing method according to an embodiment of the present invention includes the steps of detecting features of input image information for a plurality of classes, calculating the degrees of belongingness of the detected features to the classes, providing prediction coefficients for the classes, calculating pieces of predictive image information for the classes on the basis of the weighted pieces of the image information and the provided prediction coefficients for the classes, and adding the pieces of predictive image information for the classes.

A second recording medium according to an embodiment of the present invention has a computer-readable program recorded therein. The program includes the steps of detecting features of input image information for a plurality of classes, calculating the degrees of belongingness of the detected features to the classes, weighting pieces of the input image information based on the degrees of belongingness, providing prediction coefficients for the classes, calculating pieces of predictive image information for the classes on the basis of the weighted pieces of the image information and the provided prediction coefficients for the classes, and adding the pieces of predictive image information for the classes.

A third image processing apparatus according to an embodiment of the present invention includes a feature detecting means which detects features of image information for a plurality of classes, the image information being input for learning, a belongingness calculating means which calculates the degrees of belongingness of the detected features to the classes, a weighting means which weights pieces of the input image information based on the degrees of belongingness, and a prediction coefficient calculating means which calculates prediction coefficients for the classes based on the weighted pieces of the image information.

A fourth image processing apparatus according to an embodiment of the present invention includes a feature detecting means which detects features of input image information for a plurality of classes, a belongingness calculating means which calculates the degrees of belongingness of the detected features to the classes, a weighting means which weights pieces of the input image information based on the degrees of belongingness, a providing means which provides prediction coefficients for the classes, a predictive-image-information calculating means which calculates pieces of predictive image information for the classes on the basis of the weighted pieces of the image information and the provided prediction coefficients for the classes, and an adder means which adds the pieces of the predictive image information for the classes.

In a first embodiment of the present invention, features of image information for a plurality of classes are detected, the image information being input for learning. the degrees of belongingness of the detected features to the classes are calculated, and the input image information is weighted based on the degrees of belongingness. Based on the weighted pieces of the image information, prediction coefficients for the classes are calculated.

In a second embodiment of the present invention, features of input image information for a plurality of classes are detected and the degrees of belongingness of the detected features to the classes are calculated. The input image information is weighted based on the degrees of belongingness. Based on pieces of the weighted image information and provided prediction coefficients for the classes, predictive image information for the classes are calculated and added.

BRIEF DESCRIPTION OF THE DRAWINGS

FIG. 3 is a more detailed block diagram showing the configurations of the normalizing unit and determination setting unit shown in FIG. 1;

FIG. 6 is a detailed flowchart illustrating the class-belongingness calculating process in the step S3 shown in FIG. 5;

FIG. 13A is an illustration of another example of the horizontal edge detecting operator;

FIG. 13B is an illustration of another example of the vertical edge detecting operator;

FIG. 13C is an illustration of another example of the upward-sloping edge detecting operator;

FIG. 13D is an illustration of another example of the downward-sloping edge detecting operator;

DESCRIPTION OF THE PREFERRED EMBODIMENTS

An image processing apparatus according to an embodiment of the present invention is described below. In the following embodiment, classification adaptive processing generates a high resolution image based on a low resolution image.

Figure 1:
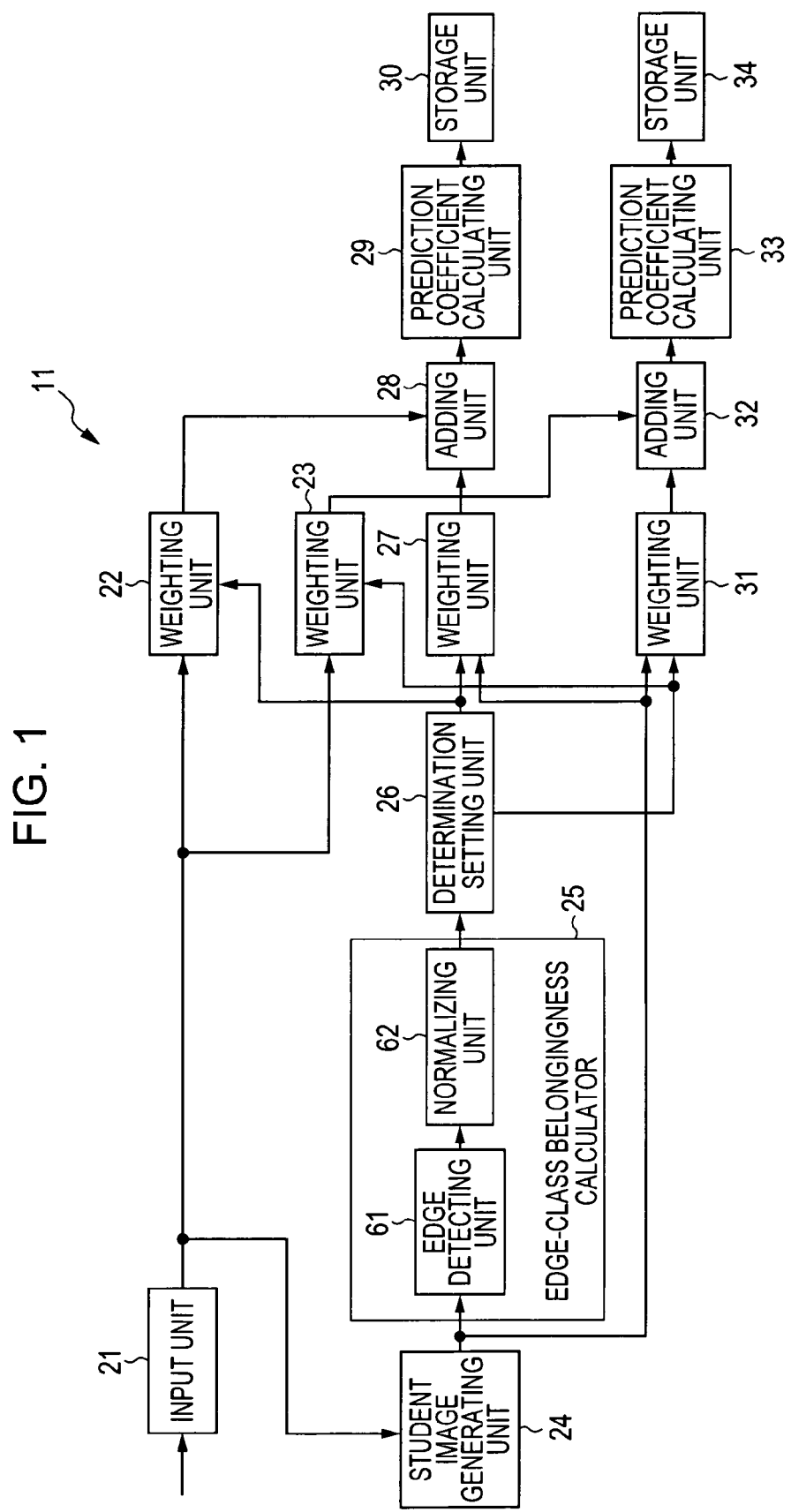
FIG. 1 is a block diagram showing the configuration of an image processing apparatus according to an embodiment of the present invention.

FIG. 1 shows an example of the configuration of an image processing apparatus 11 according to an embodiment of the present invention. The image processing apparatus 11 includes an input unit 21, weighting units 22 and 23, a student image generating unit 24, an edge-class belongingness calculator 25, a determination setting unit 26, a weighting unit 27, an adding unit 28, a prediction coefficient calculating unit 29, a storage unit 30, a weighting unit 31, an adding unit 32, a prediction coefficient calculating unit 33, and a storage unit 34.

The edge-class belongingness calculator 25 includes an edge detecting unit 61 and a normalizing unit 62.

The input unit 21 receives teacher image data of an image having high quality (including high resolution) from an apparatus (not shown), and outputs the teacher image data to the student image generating unit 24. The student image generating unit 24 generates, from the teacher image data supplied from the input unit 21, student image data that represents image quality lower than that represented by the teacher image data, and outputs the student image data to the edge detecting unit 61. The edge detecting unit 61 detects an edge of the student image data generated by the student image generating unit 24 and outputs the detected edge to the normalizing unit 62. The normalizing unit 62 normalizes the edge and outputs the normalized edge to the determination setting unit 26. The determination setting unit 26 calculates a predetermined weight based on an output from the normalizing unit 62, and sets the weight in the weighting units 27 and 31. Similarly, the set weight is output to the weighting units 22 and 23.

The weighting units 27 and 31 use the weight set in the determination setting unit 26 to weight the student image data supplied from the student image generating unit 24, and respectively output the weighted student image data to the adding units 28 and 32. Similarly, the weighting units 22 and 23 uses the weight supplied from the determination setting unit 26 to weight the teacher image data input from the input unit 21, and respectively output the weighted teacher image data to the adding units 28 and 32.

By adding, to a sum matrix, the teacher image data supplied from the weighting unit 22 and the student image data supplied from the weighting unit 27, the adding unit 28 generates a matrix (equation). The adding unit 28 outputs the generated matrix to the prediction coefficient calculating unit 29. The prediction coefficient calculating unit 29 calculates a prediction coefficient by solving the equation supplied from the adding unit 28, and outputs and stores the calculated coefficient in the storage unit 30.

Similarly, by adding, to a sum matrix, the teacher image data supplied from the adding unit 23 and the student image data supplied from the weighting unit 31, the adding unit 32 generates an equation, and the adding unit 32 outputs the generated equation to the prediction coefficient calculating unit 33. The prediction coefficient calculating unit 33 calculates a prediction coefficient by solving the equation, and outputs and stores the coefficient in the storage unit 34.

In this embodiment, edges are detected as an image feature. For an edge in one direction, two classes, that is, a convex edge (edge whose luminance is higher than that of its periphery) class and a concave edge (edge whose luminance is lower than that of its periphery) class are associated. The weighting unit 27, the adding unit 28, the prediction coefficient calculating unit 29, and the storage unit 30 form a system for calculating a convex edge prediction coefficient. The weighting unit 31, the adding unit 32, the prediction coefficient calculating unit 33, and the storage unit 34 form a system for calculating a concave edge prediction coefficient.

Figure 2B:
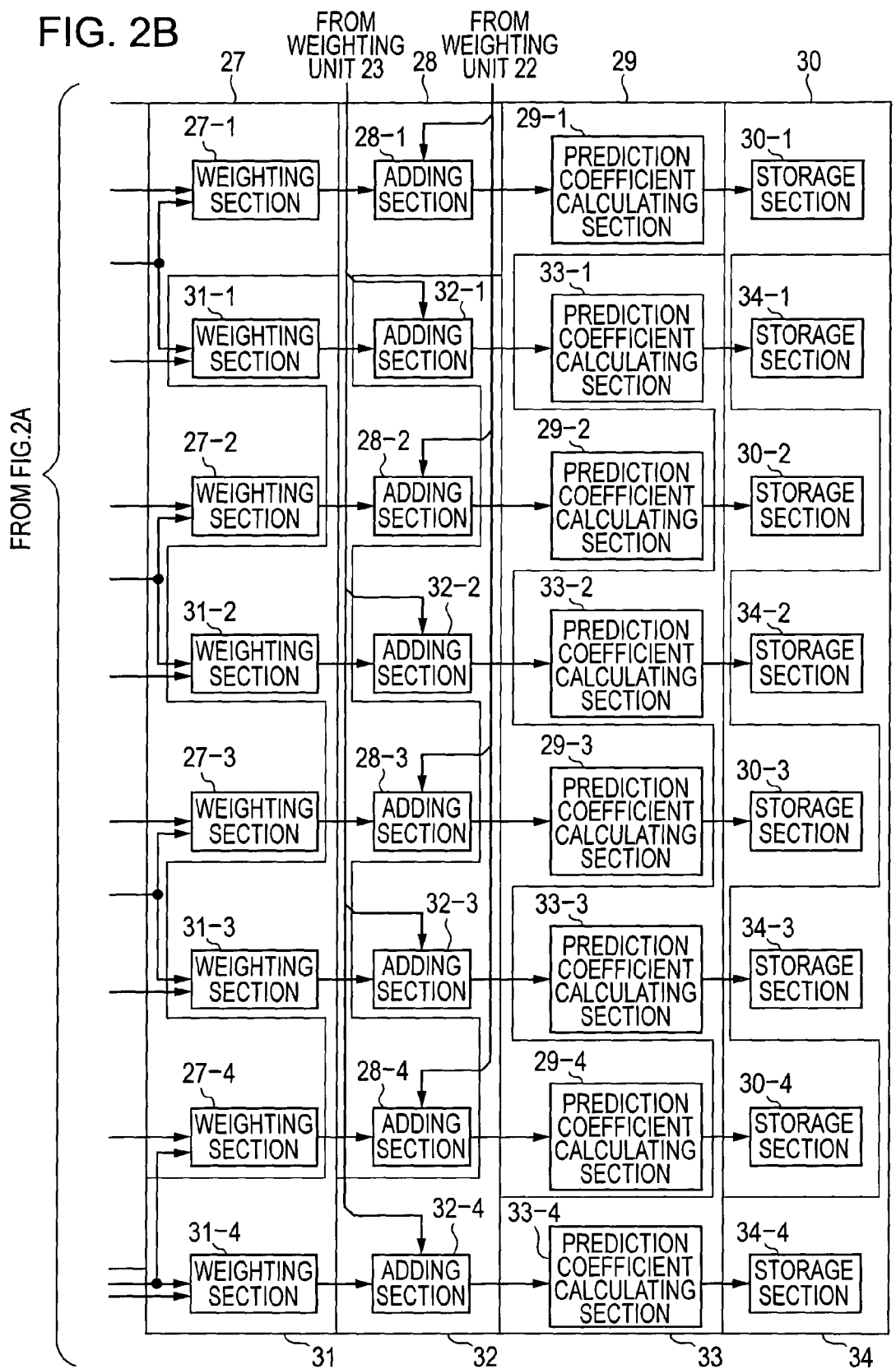
FIG. 2 is a more detailed block diagram showing the configurations of the edge-class belongingness calculating unit, determination setting unit, weighting units, adding units, prediction coefficient calculating units, and storage units shown in FIG. 1.

FIG. 2 shows more detailed examples of the configurations of the edge-class belongingness calculator 25, the determination setting unit 26, the weighting unit 27, the adding unit 28, the prediction coefficient calculating unit 29, the storage unit 30, the weighting unit 31, the adding unit 32, the prediction coefficient calculating unit 33, and the storage unit 34.

Since edges in four directions are detected in this embodiment, the edge detecting unit 61 includes edge detecting sections 61-1 to 61-4 corresponding to the edges in the four directions, and the normalizing unit 62 includes normalizing sections 62-1 to 62-4. The determination setting unit 26 specifically includes determination setting sections 26-1 to 26-4. Similarly, the weighting unit 27 includes weighting sections 27-1 to 27-4, and the weighting unit 31 includes weighting sections 31-1 to 31-4. The adding unit 28 includes adding sections 28-1 to 28-4, and the adding unit 32 includes adding sections 32-1 to 32-4. The prediction coefficient calculating unit 29 includes prediction coefficient calculating sections 29-1 to 29-4, and the prediction coefficient calculating unit 33 includes prediction coefficient calculating sections 33-1 to 33-4. The storage unit 30 includes storage sections 30-1 to 30-4, and the storage unit 34 includes storage sections 34-1 to 34-4.

The edge detecting sections 61-1 to 61-4 detect edges for the student image data input from the student image generating unit 24 and output the detected edge data items to the corresponding normalizing sections 62-1 to 62-4. The normalizing sections 62-1 to 62-4 normalize the edge data items from the edge detecting sections 61-1 to 61-4.

The determination setting section 26-1 calculates a weight based on the normalized value input from the normalizing section 62-1, and sets the calculated weight in the weighting section 27-1 for the convex edge and the weighting section 31-1 for the concave edge. In this embodiment, the normalized value is directly used as one weight, and the other weight is set to zero. When the polarity of the result of detection by the edge detecting section 61-1 is positive, the determination setting section 26-1 sets the normalized value in the weighting section 27-1 for the convex edge, and sets zero as a weight in the weighting section 31-1 for the concave edge. When the polarity is negative, the normalized value is set in the weighting section 31-1, and zero is set as a weight in the weighting section 27-1.

In other words, each of the edge detecting sections 61-1 to 61-4 detects two edges, a convex edge and a concave edge. Since the detected edge is identified based on its polarity, for the actually detected edge (one of the convex and concave edges that is determined based on its polarity), a corresponding weight (calculated value) is set, and, for an undetected edge (the other edge), zero that represents no detection is set as zero.

Based on the weight supplied from the determination setting section 26-1, the weighting section 27-1 weights the student image data supplied from the student image generating unit 24, and outputs the weighted data to the adding section 28-1. Based on the weight set in the determination setting section 26-1, the weighting section 31-1 weights the student image data supplied from the student image generating unit 24, and outputs the weighted data to the adding section 32-1. The adding section 28-1 generates an equation by adding, to a sum matrix, teacher image data weighted by the weighting section 22-1 (described later) shown in FIG. 4 and student image data weighted by the weighting section 27-1, and outputs the generated equation to the prediction coefficient calculating section 29-1. The prediction coefficient calculating section 29-1 calculates a prediction coefficient by solving the equation supplied from the adding section 28-1, and outputs and stores the calculated prediction coefficient in the storage section 30-1.

The adding section 32-1 generates an equation by adding, to a sum matrix, teacher image data weighted by the weighting section 23-1 (described later) shown in FIG. 4 and student image data weighted by the weighting section 31-1, and outputs the equation to the prediction coefficient calculating section 33-1. The prediction coefficient calculating section 33-1 calculates a prediction coefficient by solving the equation supplied from the adding section 32-1, and outputs and stores the prediction coefficient in the storage section 34-1.

Similarly, the weighting section 27-2 weights the student image data by using the weight for the convex edge set in the determination setting section 26-2, and outputs the weighted data to the adding section 28-2. The weighting section 31-2 weights the student image data by using the weight for the concave edge set in the determination setting section 26-2, and outputs the weighted data to the adding section 32-2. The adding section 28-2 generates an equation by adding, to a sum matrix, teacher image data weighted by the weighting section 22-2 shown in FIG. 4 and student image data weighted by the weighting section 27-2, and outputs the generated equation to the prediction coefficient calculating section 29-2. The adding section 32-2 generates an equation by adding, to a sum matrix, teacher image data weighted by the weighting section 23-2 shown in FIG. 4 and student image data weighted by the weighting section 31-2, and outputs the generated equation to the prediction coefficient calculating section 33-2. The prediction coefficient calculating section 29-2 calculates a prediction coefficient by solving the output equation, and outputs and stores the prediction coefficient in the storage section 30-2. The prediction coefficient calculating section 33-2 calculates a prediction coefficient by solving the output equation, and outputs and stores the prediction coefficient in the storage section 34-2.

The weighting section 27-3 weights the student image data by using the weight for the convex edge set in the determination setting section 26-3, and outputs the weighted data to the adding section 28-3. The weighting section 31-3 weights the student image data by using the weight for the concave edge set in the determination setting section 26-3, and outputs the weighted data to the adding section 32-3. The adding section 28-3 generates an equation by adding, to a sum matrix, the teacher image data supplied from the weighting section 22-3 shown in FIG. 4 and the student image data input from the weighting section 27-3, and outputs the generated equation to the prediction coefficient calculating section 29-3. The adding section 32-3 generates an equation by adding, to a sum matrix, the teacher image data supplied from the weighting section 23-3 and the student image data supplied from the weighting section 31-3, and outputs the generated equation to the prediction coefficient calculating section 33-3. The prediction coefficient calculating section 29-3 calculates a prediction coefficient by solving the output equation, and outputs and stores the prediction coefficient in the storage section 30-3. The prediction coefficient calculating section 33-3 calculates a prediction coefficient by solving the output equation, and outputs and stores the prediction coefficient in the storage section 34-3.

The weighting section 27-4 weights the student image data by using the weight for the convex edge input from the determination setting section 26-4, and outputs the weighted data to the adding section 28-4. The weighting section 31-4 weights the student image data by using the weight for the concave edge set in the determination setting section 26-4, and outputs the weighted data to the adding section 32-4. The adding section 28-4 generates an equation by adding, to a sum matrix, the teacher image data supplied from the weighting section 22-4 shown in FIG. 4 and the student image data supplied from the weighting section 27-4, and outputs the generated equation to the prediction coefficient calculating section 29-4. The adding section 32-4 generates an equation by adding, to a sum matrix, the student image data input from the weighting section 31-4 and the teacher image data input from the weighting section 23-4 shown in FIG. 4, and outputs the generated equation to the prediction coefficient calculating section 33-4. The prediction coefficient calculating section 29-4 calculates a prediction coefficient by solving the output equation, and outputs and stores the prediction coefficient in the storage section 30-4. The prediction coefficient calculating section 33-4 calculates a prediction coefficient by solving the output equation, and outputs the prediction coefficient to the storage section 34-4.

FIG. 3 shows more detailed configurations of the normalizing unit 62 and the determination setting unit 26. The normalizing section 62-1 includes an absolute value calculating section 91-1 and a dividing section 92-1. The normalizing section 62-2 includes an absolute value calculating section 91-2 and a dividing section 92-2. The normalizing section 62-3 includes a dividing section 92-3 and a dividing section 92-3. The normalizing section 62-4 includes an absolute value calculating section 91-4 and a dividing section 92-4. The normalizing unit 62 further includes an adder section 93.

The determination setting section 26-1 includes a setting portion 101-1 and a determining portion 102-1. The determination setting section 26-2 includes a setting portion 101-2 and a determining portion 102-2. The determination setting section 26-3 includes a setting portion 101-3 and a determining portion 102-3. The determination setting section 26-4 includes a setting portion 101-4 and a determining portion 102-4.

The absolute value calculating section 91-1 calculates the absolute value of an edge detection result supplied from the edge detecting section 61-1, and outputs the calculated absolute value to the dividing section 92-1 and the adder section 93. The dividing section 92-1 divides the absolute value supplied from the absolute value calculating section 91-1 by a sum supplied from the adder section 93, and the obtained quotient to the setting portion 101-1. The absolute value calculating section 91-1 outputs, to the determining portion 102-1, the polarity of the detection result input from the edge detecting section 61-1. The determining portion 102-1 determines the type of the polarity output from the absolute value calculating section 91-1, and outputs the result of determination to the setting portion 101-1. When the result of determination by the determining portion 102-1 is positive, the setting portion 101-1 sets the value (quotient) output from the dividing section 92-1, as a weight, in the weighting section 27-1 for the convex edge, and sets zero as a weight in the weighting section 31-1 for the concave edge.

The weight set in the weighting section 27-1 for the convex edge of the student image data is also output to the weighting section 22-1 for the convex edge of the teacher image data, and the weight output to the weighting section 31-1 for the concave edge of the student image data is also output to the weighting section 23-1 for the concave edge of the teacher image data.

The absolute value calculating section 91-2 calculates the absolute value of the edge detection data supplied from the edge detecting section 61-2, and outputs the calculated absolute value to the dividing section 92-2 and to the adder section 93. The dividing section 92-2 outputs, to the setting portion 101-2, a value obtained by dividing the absolute value output from the absolute value calculating section 91-2 by a sum supplied from the adder section 93. The determining portion 102-2 determines the type of edge detection data supplied from the absolute value calculating section 91-2, and outputs the result of determination to the setting portion 101-2. When the determined result is positive, the setting portion 101-2 sets the value output from the dividing section 92-2 in the weighting section 27-2 for the convex edge, and sets zero in the weighting section 31-2 for the concave edge. Conversely, when the result of determination is negative, the setting portion 101-2 sets the value output from the dividing section 92-2 in the weighting section 31-2 for the concave edge, and sets zero in the weighting section 27-2 for the convex edge. The weight set in the weighting section 27-2 is output to the weighting section 22-2 for the convex edge of the teacher image data, and the weight set in the weighting section 31-2 is output to the weighting section 23-2 for the concave edge of the teacher image data.

Similarly, the absolute value calculating section 91-3 calculates the absolute value of the edge detection result supplied from the edge detecting section 61-3, and outputs the obtained absolute value to the dividing section 92-3 and the adder section 93. The dividing section 92-3 outputs, to the setting portion 101-3, a value obtained by dividing the absolute value from the absolute value calculating section 91-3 by the sum from the adder section 93. The determining portion 102-3 determines the type of the polarity supplied from the absolute value calculating section 91-3, and outputs the result of determination to the setting portion 101-3. When the result of determination by the determining portion 102-3 is positive, the setting portion 101-3 sets the weight from the dividing section 92-3 in the weighting section 27-3 for the convex edge, and sets zero in the weighting section 31-3 for the concave edge. Conversely, when the result of determination is negative, the setting portion 101-3 sets zero as a weight in the weighting section 27-3, and sets the weight output from the dividing section 92-3 in the weighting section 31-3 for the concave edge. The weight set in the weighting section 27-3 for the convex edge is set in the weighting section 22-3 for the convex edge of the teacher image data, and the weight set in the weighting section 31-3 for the concave edge is set in the weighting section 23-3 for the concave edge of the teacher image data.

The dividing section 91-4 calculates the absolute value of the edge detection result output from the edge detecting section 61-4, and outputs the absolute value to the dividing section 92-4 and the adder section 93. The dividing section 92-4 outputs, to the setting portion 101-4, a value obtained by dividing the absolute value output from the absolute value calculating section 91-4 by the sum output from the adder section 93. The determining portion 102-4 determines the type of the polarity output from the absolute value calculating section 91-4, and outputs the result of determination to the setting portion 101-4. When the result of determination by the determining portion 102-4 is positive, the setting portion 101-4 sets the weight output from the dividing section 92-4 in the weighting section 27-4, and sets zero as a weight in the weighting section 31-4 for the concave edge. When the result of determination is negative, the setting portion 101-4 sets zero as a weight in the weighting section 27-4 for the convex edge, and sets the weight output from the dividing section 92-4 in the weighting section 31-4 for the concave edge. The weight set in the weighting section 27-4 for the convex edge is output to the weighting section 22-4 for the convex edge of the teacher image data, and the weight set in the weighting section 31-4 for the concave edge is output to the weighting section 23-4 for the concave edge of the teacher image data.

The adder section 93 adds the absolute values supplied from the absolute value calculating sections 91-1 to 91-4, and outputs the obtained sum to the dividing sections 92-1 to 92-4.

Figure 4:
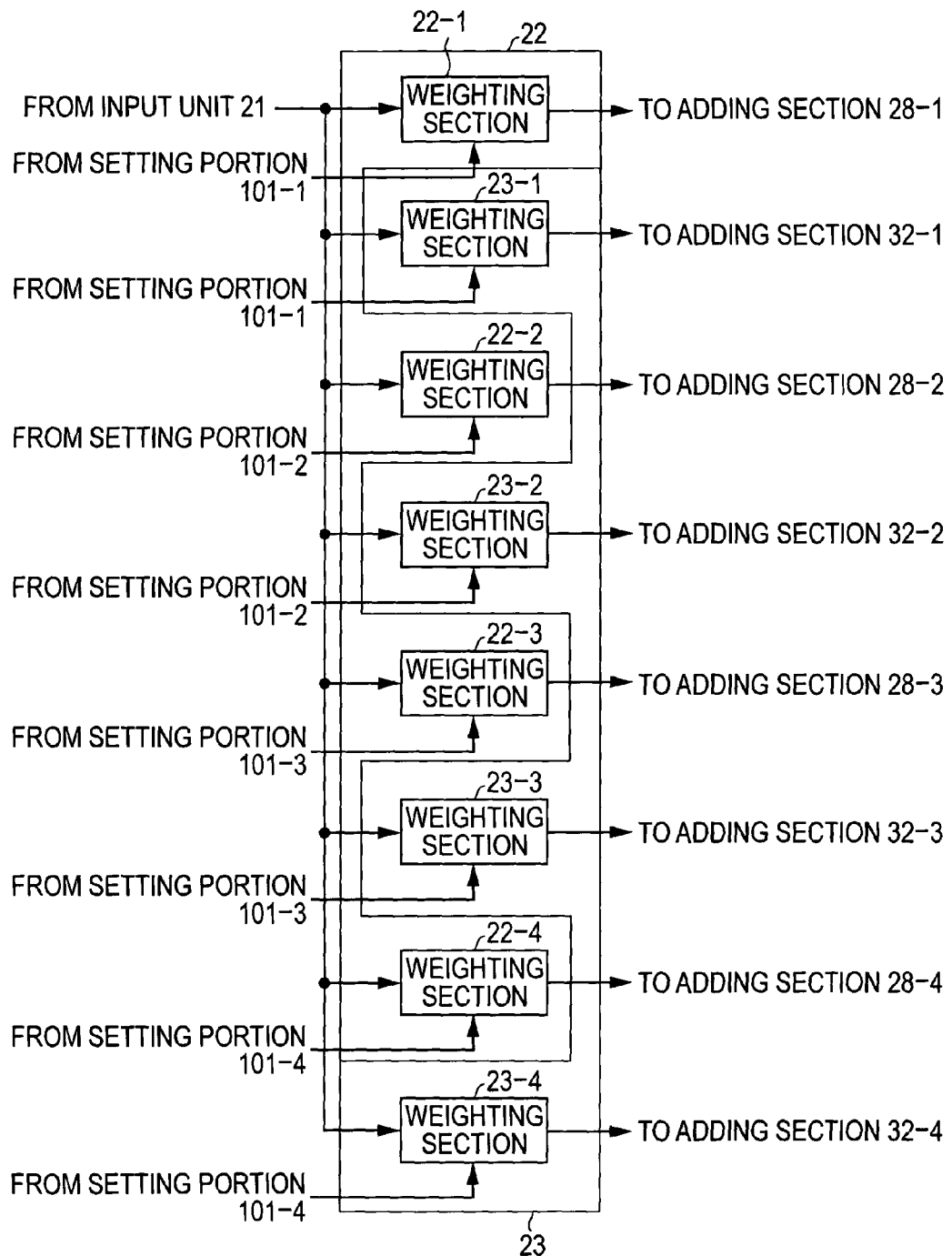
FIG. 4 is a more detailed block diagram showing the configuration of the weighting units shown in FIG. 1.

FIG. 4 shows detailed examples of the configurations of the weighting units 22 and 23. The weighting unit 22 for the convex edge includes weighting sections 22-1 to 22-4. The weighting unit 23 for the concave edge includes weighting sections 23-1 to 23-4.

The weighting section 22-1 for the convex edge weights the teacher image data supplied from the input unit 21 by using the weight for the convex edge supplied from the setting portion 101-1, and outputs the weighted data to the adding section 28-1. The weighting section 23-1 for the concave edge weights the teacher image data supplied from the input unit 21 by using the weight for the concave edge supplied from the setting portion 101-1, and outputs the weighted data to the adding section 32-1.

The weighting section 22-2 for the convex edge weights the teacher image data by using the weight for the convex edge supplied from the setting portion 101-2, and outputs the weighted data to the adding section 28-2. The weighting section 23-2 for the concave edge weights the teacher image data supplied from the input unit 21 by using the weight for the concave edge supplied from the setting portion 101-2, and outputs the weighted data to the adding section 32-2. The weighting section 22-3 for the convex edge weights the teacher image data supplied from the input unit 21 by using the weight for the convex edge supplied from the setting portion 101-3, and outputs the weighted data to the adding section 28-3. The weighting section 23-3 for the concave edge weights the teacher image data supplied from the input unit 21 by using the weight for the concave edge supplied from the setting portion 101-3, and outputs the weighted data to the adding section 32-3. The weighting section 22-4 for the convex edge weights the teacher image data supplied from the input unit 21 by using the weight for the convex edge supplied from the setting portion 101-4, and outputs the weighted data to the adding section 28-4. The weighting section 23-4 for the concave edge weights the teacher image data supplied from the input unit 21 by using the weight for the concave edge supplied from the setting portion 101-4, and outputs the weighted data to the adding section 32-4.

Figure 5:
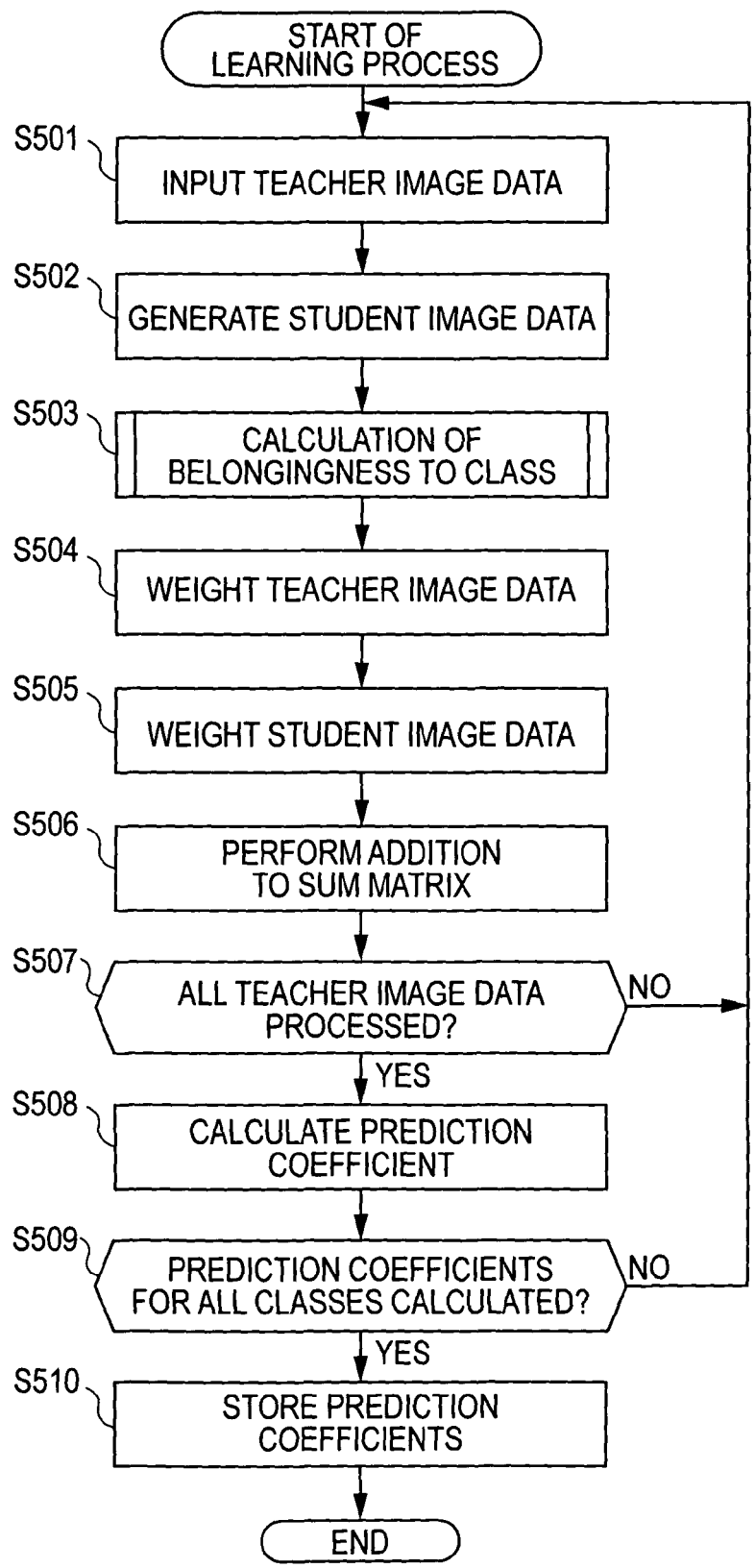
FIG. 5 is a flowchart illustrating a learning process of the image processing apparatus shown in FIG. 1.

Next, a learning process of the image processing apparatus 11 is described with reference to the flowchart shown in FIG. 5.

In step S501, teacher image data is input to the input unit 21. In step S502, the student image generating unit 24 generates student image data. Specifically, in step S502, the student image data is generated by decimating the teacher image data by performing band-limiting low-pass filtering corresponding to an appropriate number of taps.

In step S503, the edge-class belongingness calculator 25 performs a class-belongingness calculating process. Details of the class-belongingness calculating process are shown in the flowchart shown in FIG. 6.

In other words, in step S601, the edge detecting sections 61-1 to 61-4 obtain values by performing convolution calculation using the image data and edge detecting operators. The edge detecting section 61-1 detects a horizontal edge. The edge detecting section 61-2 detects a vertical edge. The edge detecting section 61-3 detects a 45-degree upward-sloping edge. The edge detecting section 61-4 detects a 45-degree downward-sloping edge. Accordingly, for example, the edge detecting section 61-1 uses the horizontal edge detecting operator shown in FIG. 7A. The edge detecting section 61-2 uses the vertical edge detecting operator shown in FIG. 7B. The edge detecting section 61-3 uses the 45-degree-upward-sloping edge detecting operator shown in FIG. 7C. The edge detecting section 61-4 uses the 45-degree-downward-sloping edge detecting operator shown in FIG. 7D.

Figure 7A:
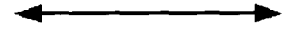
FIG. 7A is an illustration of an example of the configuration of a horizontal edge detecting operator.
Figure 7B:
FIG. 7B is an illustration of an example of the configuration of a vertical edge detecting operator.
Figure 7C:
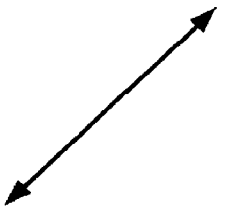
FIG. 7C is an illustration of an example of the configuration of a upward-sloping edge detecting operator.
Figure 7D:
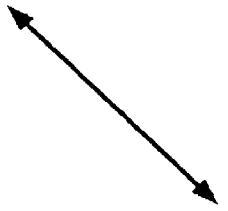
FIG. 7D is an illustration of an example of the configuration of a downward-sloping edge detecting operator.

As shown in FIG. 7A, the horizontal edge detecting operator has values in a 3×3 tap and has values −0.5, −0.5, −0.5, 1.0, 1.0, 1.0, −0.5, −0.5, and −0.5 from the top left to the bottom right. As shown in FIG. 7B, the vertical edge detecting operator has values −0.5, 1.0, −0.5, −0.5, 1.0, −0.5, −0.5, 1.0, and −0.5. As shown in FIG. 7C, the 45-degree-upward-sloping edge detecting operator has values −0.5, −0.5, 1.0, −0.5, 1.0, −0.5, 1.0, −0.5, and −0.5. As shown in FIG. 7D, the 45-degree-downward-sloping edge detecting operator has values 1.0, −0.5, −0.5, −0.5, 1.0, −0.5, −0.5, −0.5, and 1.0.

Figures 8, 9:
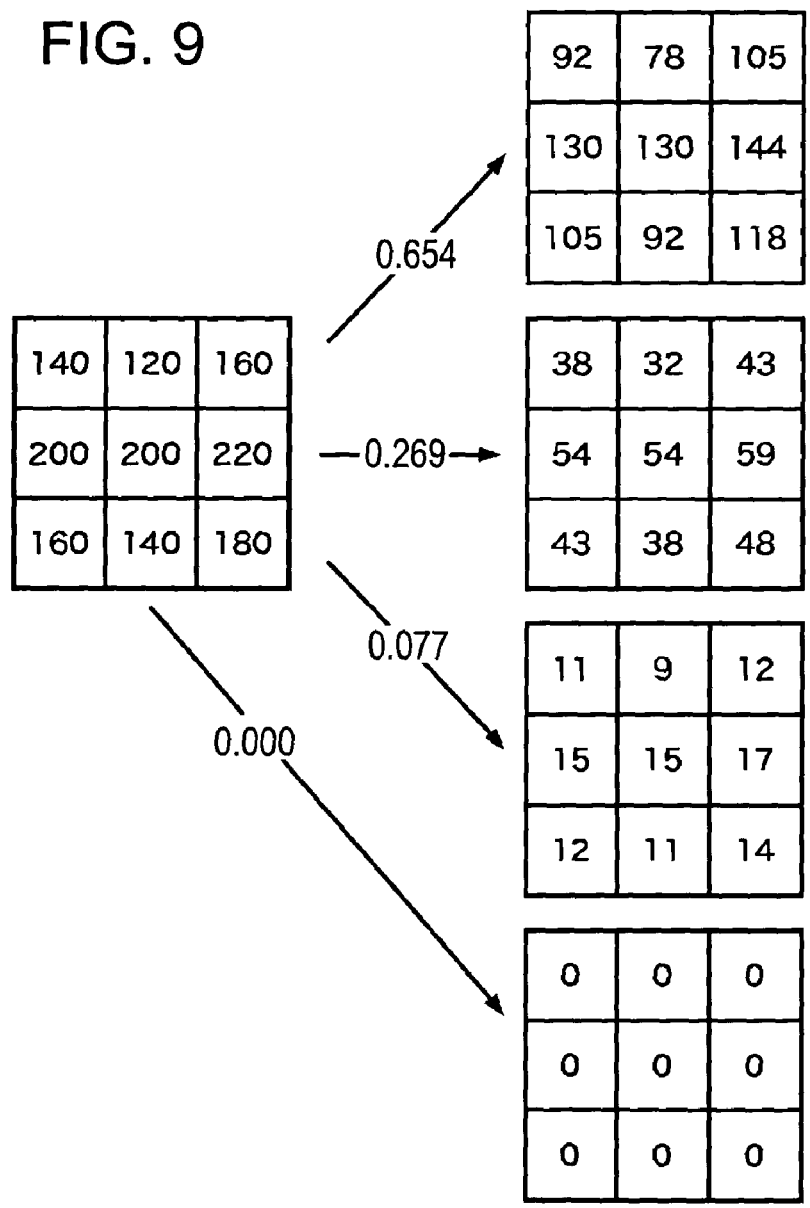
FIG. 8 is an illustration of an example of image data.
FIG. 9 is an illustration of data weighting.

It is assumed that, as shown in FIG. 8, 3×3 pixels of the input student image data have values 140, 120, 160, 200, 200, 220, 160, 140, and 180 from the top left to the bottom right. In this case, the edge detecting section 61-1 performs the following calculation:

(−0.5)×140+(−0.5)×120+(−0.5)×160+(1.0)×200+(1.0)×200+(1.0)×220+(−0.5)×160+(−0.5)×140+(−0.5)×180=170

The edge detecting section 61-2 performs the following calculation:

(−0.5)×140+(1.0)×120+(−0.5)×160+(−0.5)×200+(1.0)×200+(−0.5)×220+(−0.5)×160+(1.0)×140+(−0.5)×180=−70

The edge detecting section 61-3 performs the following calculation:

(−0.5)×140+(−0.5)×120+(1.0)×160+(−0.5)×200+(1.0)×200+(−0.5)×220+(1.0)×160+(−0.5)×140+(−0.5)×180=0

The edge detecting section 61-4 performs the following calculation:

(1.0)×140+(−0.5)×120+(−0.5)×160+(−0.5)×200+(1.0)×200+(−0.5)×220+(−0.5)×160+(−0.5)×140+(1.0)×180=20

In step S602, the absolute value calculating sections 91-1 to 91-4 calculate the absolute values of the calculated values. In this case, the absolute value calculating section 91-1 calculates the absolute value of 170. The absolute value calculating section 91-2 calculates the absolute value of −70. The absolute value calculating section 91-3 calculates the absolute value of zero. The absolute value calculating section 91-4 calculates the absolute value of 20. In step S23, the adder section 93 adds the absolute values to calculate the sum of the values. Since, in this case, the absolute value output from the absolute value calculating section 91-1 is 170, the absolute value output from the absolute value calculating section 91-2 is 70, the absolute value output from the absolute value calculating section 91-3 is zero, and the absolute value output from the absolute value calculating section 91-4 is 20, the sum calculated by the adder section 93 is 260. In step S604, the dividing sections 92-1 to 92-4 obtain normalized values by dividing the calculated values by the calculated sum. In this case, the dividing section 92-1 outputs 0.654 by dividing 170 by 260. The dividing section 92-2 outputs 0.269 obtained by dividing 70 by 260. The dividing section 92-3 outputs 0.000 obtained by dividing zero by 260. The dividing section 92-4 outputs 0.077 obtained by dividing 20 by 260. Each of the normalized values represents belongingness of the student image data to each class corresponding to each edge direction. The greater (i.e., the closer to one) the value of the belongingness, the higher the belongingness to the class.

In step S605, each of the determining portions 102-1 to 102-4 determines whether the calculated value is positive. Since the calculated value (+170) is input from the edge detecting section 61-1 to the absolute value calculating section 91-1, the determining portion 102-1 outputs the determination of positiveness to the setting portion 101-1. In this case, in step S606, the setting portion 101-1 sets the normalized value as belongingness to a class corresponding to positiveness. In step S607, the setting portion 101-1 also sets zero as a weight as belongingness to a class corresponding to negativeness. In other words, the edge detected by the edge detecting section 61-1 is a convex edge (edge having a luminance higher than that of its periphery) and is not a concave edge (edge having a luminance lower than that of its periphery). Thus, the setting portion 101-1 sets, in the weighting section 27-1 for the convex edge, 0.654 input as a weight by the dividing section 92-1. Similarly, 0.654 is set as a weight in the weighting section 22-1 for the convex edge of teacher image, and 0.000 is set as a weight in the weighting section 23-1.

In addition, since the calculated value (−70) is input from the edge detecting section 61-2 to the absolute value calculating section 91-2, a negative polarity is input to the determining portion 102-2, and negativeness determination is input from the determining portion 102-2 to the setting portion 101-2. Accordingly, the process proceeds from step S605 to step S608. In step S608, the setting portion 101-2 sets the normalized value as belongingness to a class corresponding to negativeness. In addition, in step S609, the setting portion 101-2 sets zero as a weight as belongingness to a class corresponding to positiveness. Specifically, the setting portion 101-2 sets, in the weighting section 23-2 for the concave edge, the weight 0.269 input by the dividing section 92-2, and sets 0.000 in the weighting section 27-2 for the convex edge. Therefore, 0.269 is set as a weight in the weighting section 23-2 for the concave edge of teacher image, and 0.000 is set as a weight in the weighting section 22-2 for the convex edge. In other words, this processing is performed since the edge detected by the edge detecting section 61-2 is not a convex edge but a concave edge.

Similarly, since the calculated value (zero) is input to the absolute value calculating section 91-3, the determining portion 102-3 determines that the polarity is positive, and outputs the positiveness determination to the setting portion 101-3. Accordingly, the setting portion 101-3 performs steps S606 and S607, and sets 0.000 as a weight both in the weighting section 27-3 for the convex edge and in the weighting section 23-3 for the concave edge. In other words, in this case, in each section, zero is set. Also in the weighting sections 22-3 and 23-3 for the teacher image data, 0.000 is set as a weight.

In addition, the absolute value calculating section 91-4 receives the calculated value (+20) from the edge detecting section 61-4. Thus, the determining portion 102-4 determines that the polarity is positive, and outputs the positiveness determination to the setting portion 101-4.

Accordingly, in steps S606 and S607, the setting portion 101-4 sets, in the weighting section 27-4 for the convex edge, the weight 0.077 input by the dividing section 92-4, and sets the weight 0.000 in the weighting section 31-4 for the concave edge. The weight 0.077 is set in the weighting section 22-4 for the convex edge of teacher image data, and the weight 0.000 is set in the weighting section 23-4 for the concave edge.

Referring back to FIG. 5, in step S504, the weighting sections 22-1 to 22-4, and 23-1 to 23-4, the teacher image data is weighted. In other words, the weighting sections 22-1 to 22-4, and 23-1 to 23-4 weight the teacher image data by using the weights set by the setting portions 101-1 to 101-4.

Furthermore, in step S505, the weighting sections 27-1 to 27-4, and 31-1 to 31-4 weight the student image data. This weighting is further described below.

For example, 0.654 is input as a convex edge weight from the determination setting section 26-1 to the weighting section 27-1 for the horizontal convex edge. Accordingly, for example, when the student image data as shown in FIG. 8 is input, by weighting each pixel value to have 0.654, the weighting section 27-1 calculates the pixel values in the top block shown in FIG. 9.

In other words, the calculated values 92, 78, 105, 130, 130, 144, 105, 92, and 118 are obtained by the following expressions:

140×0.654=92

120×0.654=78

160×0.654=105

200×0.654=130

200×0.654=130

220×0.654=144

160×0.654=105

140×0.654=92

180×0.654=118

Unlike the above, a weight of zero is set in the weighting section 31-1 for the horizontal concave edge. Therefore, the pixel values obtained after the weighting are all zeros as shown in the bottom block shown in FIG. 9.

Since the weight 0.269 is set in the weighting section 31-2 for the vertical concave edge, as shown in the second block from the top in FIG. 9, calculation represented by the following expressions is performed:

140×0.269=38

120×0.269=32

160×0.269=43

200×0.269=54

200×0.269=54

220×0.269=59

160×0.269=43

140×0.269=38

180×0.269=48

Since, in the weighting section 27-2 for the vertical convex edge, zero is set as a weight, the pixel values obtained after the weighting are all zeroes.

Since zero is set as a weight in each of the weighting sections 27-3 and 31-3 for the 45-degree-upward-sloping convex and concave edges, the pixel values obtained after the weighting are all zeroes.

Unlike that, since, in the weighting section 27-4 for the 45-degree-downward-sloping convex edge, 0.077 is set as a weight, as shown in the third block from the top in FIG. 9, calculation in the following expressions is performed:

140×0.077=11

120×0.077=9

160×0.077=12

200×0.077=15

200×0.077=15

220×0.077=17

160×0.077=12

140×0.077=11

180×0.077=14

Since, in the weighting section 31-4 for the 45-degree-downward-sloping concave edge, zero is set as a weight, the pixel values obtained after the weighting are all zeroes.

In step S506, the adding sections 28-1 to 28-4, and 32-1 to 32-4 perform addition to the sum matrix. The sum matrix is shown in the following expression (1). The values of A, W, and v in expression (1) are shown in expressions (2), (3), and (4), respectively.

$$AW = v \tag{1}$$

$$A = \begin{pmatrix} \sum_i x_{i1}x_{i1} & \sum_i x_{i1}x_{i2} & \cdots & \sum_i x_{i1}x_{ij} \\ \sum_i x_{i2}x_{i1} & \sum_i x_{i2}x_{i2} & \cdots & \sum_i x_{i2}x_{ij} \\ \vdots & \vdots & \vdots & \vdots \\ \sum_i x_{ij}x_{i1} & \sum_i x_{ij}x_{i2} & \cdots & \sum_i x_{ij}x_{ij} \end{pmatrix} \tag{2}$$

$$W = \begin{pmatrix} W_1 \\ W_2 \\ \vdots \\ W_j \end{pmatrix} \tag{3}$$

-continued $$v = \begin{pmatrix} \sum_i x_{i1} y_i \\ \sum_i x_{i2} y_i \\ \vdots \\ \sum_i x_{ij} y_i \end{pmatrix} \quad (4)$$

where X represents pixel values of the student image data (supplied from the weighting sections 27-1 to 27-4 and 31-1 to 31-4), y represents pixel values of the teacher image data (supplied from the weighting sections 22-1 to 22-4 and 23-1 to 23-4), and W represents a prediction coefficient (unknown value that is obtained by solving the matrix (equation)).

For each class, a sum matrix is provided. In other words, the adding sections 28-1 to 28-9 for the convex edge and the adding sections 32-1 to 32-4 for the concave edge have independent sum matrices. After the pixel values are weighted for each class, the weighted values are added to a sum matrix corresponding to the class.

Belongingness to class c, obtained by normalizing a feature quantity (the edge detection result by the edge detecting unit 61), is represented by $B_c$. Weighting for each class is performed by using $B_c$. Specifically, when an input tap value (pixel value of the student image data) is $G(x_1, x_2, \ldots, x_i)$, a value that is to be added to a sum matrix corresponding to class c has, in form multiplied by $B_c$, $G_c(B_c \times 1, B_c \times 2, B_c \times x_i)$.

The sum matrix in this case is represented by the following expressions:

$$B_c^2 AW = B_c v \quad (5)$$

$$B_c AW = v \quad (6)$$

As described above, in step S506, addition to the matrix is performed to generate an equation. In step S507, the input unit 21 determines whether all the student image data has been processed. If it is determined that all the student image data has not been processed yet, the process returns to step S501 and repeatedly executes the subsequent steps.

If, in step S507, it is determined that all the teacher image data has already been processed, in step S508, the prediction coefficient calculating units 29 and 33 calculate prediction coefficients. In other words, by solving equations output from the adding sections 28-1 to 28-4, the prediction coefficient calculating sections 29-1 to 29-4 calculate prediction coefficients W for convex edge classes in corresponding directions. By solving the equations outputs from the adding sections 32-1 to 32-4, the prediction coefficient calculating sections 33-1 to 33-4 calculate prediction coefficients W for concave edge class in corresponding directions.

In step S509, the prediction coefficient calculating units 29 and 33 determine whether prediction coefficients for all the classes have been obtained. If the prediction coefficients for all the classes have not been obtained, the process returns to step S501 and repeatedly executes the subsequent steps. If, in step S509, it is determined that the prediction coefficients for all the classes have been obtained, in step S510, the prediction coefficients are stored in the storage sections 30-1 to 30-4 and 34-1 to 34-4.

In other words, the prediction coefficients for the classes which are calculated by the prediction coefficient calculating sections 29-1 to 29-4 and 33-1 to 33-4 are stored in the storage sections 30-1 to 30-4 and 34-1 to 34-4, respectively.

Figure 10:
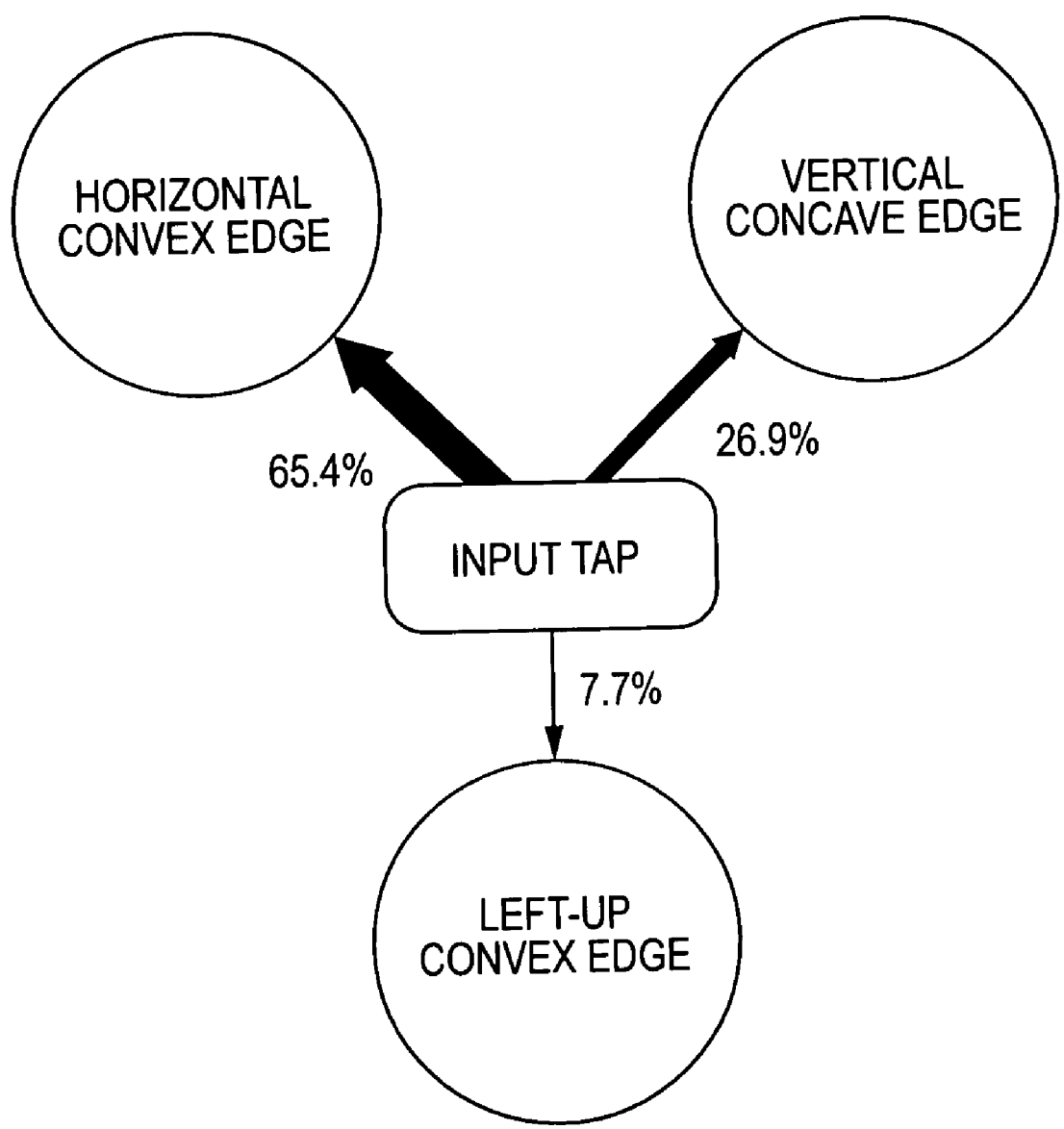
FIG. 10 is an illustration of the degrees of belongingness to classes.

As described above, in an embodiment of the present invention, classification of the input image (student image) is performed on the basis of features (edges) included in the input image. The input image is classified not only into one class but also into a plurality of classes in accordance with the degrees of belongingness to the classes which are calculated. As shown in FIG. 10, the student image data shown in FIG. 8 is classified into a vertical convex edge class based on a belongingness of 65.4%, a vertical concave edge class based on a belongingness of 26.9%, and a downward-sloping (left-up) convex edge class based on a belongingness of 7.7%. The total of the degrees of belongingness of one image to the classes is 100% (The normalization is performed therefor).

As a result, compared with the case of necessarily classifying image data into a single class, classification errors are reduced, thus enabling accurate determination of classes. In addition, by calculating prediction coefficients or the classes determined as described above, accurate prediction coefficients can be obtained. By using the prediction coefficients to perform a prediction process, data of an image having definition higher than that of an ordinary image can be calculated.

An embodiment that performs the prediction process is described below.

Figure 11B:
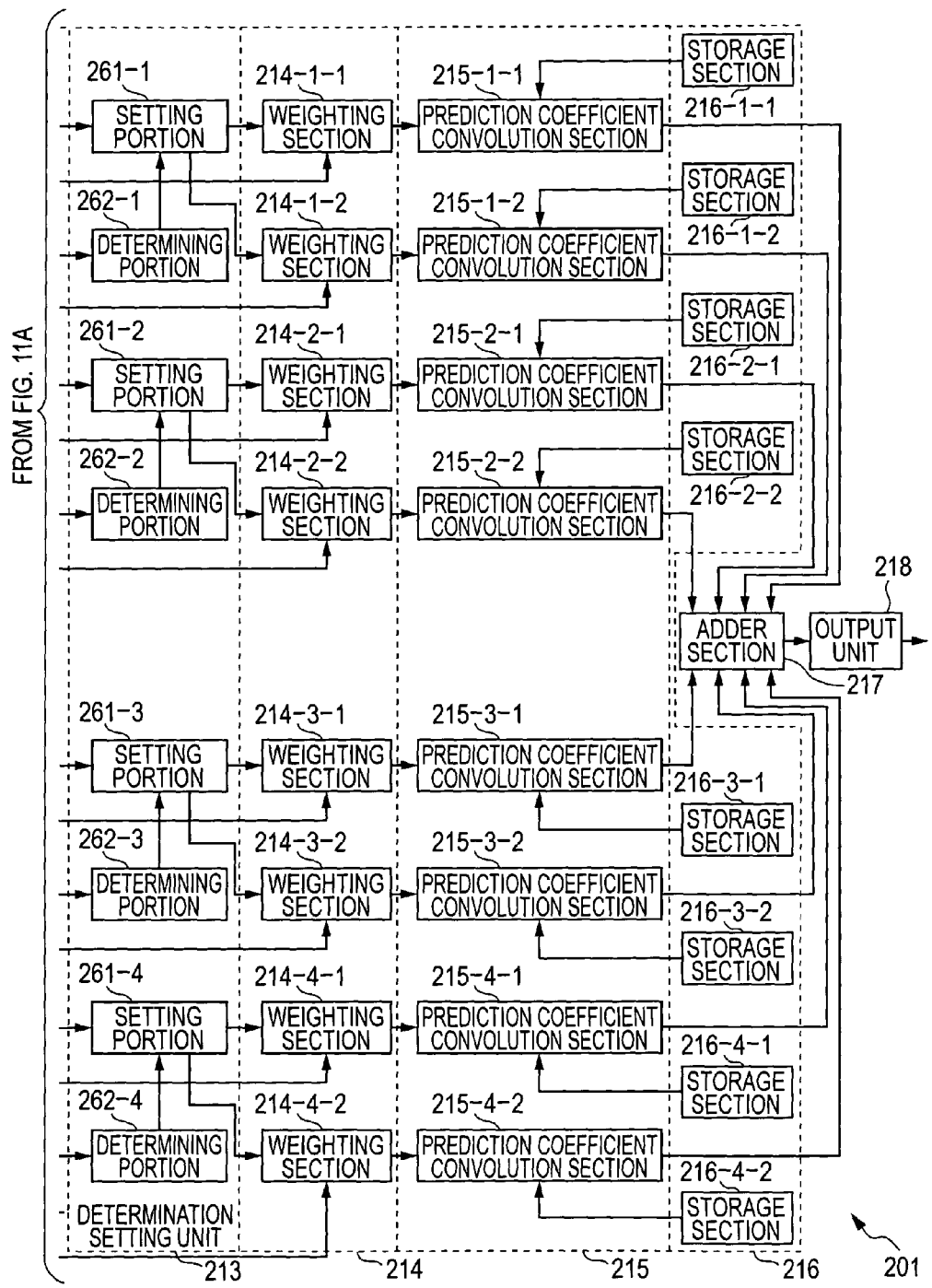
FIG. 11 is a block diagram showing the configuration of an image processing apparatus according to an embodiment of the present invention.

FIG. 11 shows an example of the configuration of an image processing apparatus 201 according to an embodiment of the present invention. The image processing apparatus 201 includes an input unit 211, an edge-class belongingness calculator 212, a determination setting unit 213, a weighting unit 214, a prediction coefficient convolution unit 215, a storage unit 216, an adder section 217, and an output unit 218.

The edge-class belongingness calculator 212 includes an edge detecting unit 231 and a normalizing unit 232. The edge detecting unit 231 includes edge detecting sections 231-1 to 231-4. The normalizing unit 232 includes an absolute value calculating unit 241 and a dividing unit 242. The absolute value calculating unit 241 specifically includes absolute value calculating sections 241-1 to 241-4. The dividing unit 242 includes dividing sections 242-1 to 242-4. The normalizing unit 232 also includes an adder section 243.

The determination setting unit 213 includes setting portions 261-1 to 261-9 and determining portions 262-1 to 262-4 respectively corresponding thereto. The weighting unit 214 includes weighting sections 214-1-1 to 214-4-2. The prediction coefficient convolution unit 215 includes prediction coefficient convolution sections 215-1-1 to 215-4-2. The storage unit 216 includes storage sections 216-1-1 to 216-4-2.

The input unit 211 receives data of an image (low resolution image corresponding to the student image generated by the student image generating unit 24 in FIG. 1) to be processed, and outputs the image data to the edge detecting sections 231-1 to 231-4. The edge detecting sections 231-1 to 231-4 detect edges of the image data from the input unit 211, and output detection results to the corresponding absolute value calculating sections 241-1 to 241-4. The absolute value calculating sections 241-1 to 241-4 calculate the absolute values of the detection results output from the edge detecting sections 231-1 to 231-4. The absolute value calculating sections 241-1 to 241-4 respectively output the calculated absolute values to the corresponding dividing sections 242-1 to 242-4, and respectively output the polarities of the detection results to the setting portions 262-1 to 262-4. The adder section 243 calculates the sum of the absolute values calculated by the absolute value calculating sections 241-1 to 241-4. The sum calculated by the adder section 243 is output to the dividing sections 242-1 to 242-4. The dividing sections 242-1 to 242-4 calculate normalized detection results by dividing the absolute values output from the absolute value calculating sections 241-1 to 241-4 by the sum output from the adder section 243.

The determining portions 262-1 to 262-4 determine the polarities output from the absolute value calculating sections 241-1 to 241-4, and output the determined detection results to the setting portions 261-1 to 261-4. Based on the polarities determined by the determining portions 262-1 to 262-4, the setting portions 261-1 to 261-4 output the normalized detection results from the dividing sections 242-1 to 242-4 to the weighting sections 214-1-1 to 214-4-1 or the weighting sections 214-1-2 to 214-4-2.

In other words, the setting portion 261-1 outputs the normalized detection result output by the dividing section 242-1 to the weighting section 214-1-1 for the convex edge when the polarity determined by the determining portion 262-1 is positive, and outputs the normalized detection result to the weighting section 214-1-2 for the concave edge when the polarity determined by the determining portion 262-1 is negative. The setting portion 261-1 sets zero as a weight in either weighting section to which the normalized detection result output by the dividing section 242-1 is not output.

When the polarity determined by the determining portion 262-2 is positive, the setting portion 261-2 outputs the normalized detection result output by the dividing section 242-2 to the weighting section 214-2-1, and sets zero as a weight in the weighting section 214-2-2 for the concave edge. Conversely, when the determined polarity is negative, the setting portion 261-2 outputs the normalized detection result output by the dividing section 242-2 to the weighting section 214-2-2 for the concave edge, and sets zero as a weight in the weighting section 214-2-1 for the convex edge.

Similarly, when the polarity determined by the determining portion 262-3 is positive, the setting portion 261-3 outputs the normalized detection result output by the dividing section 242-3 to the weighting section 214-3-1 for the convex edge, and sets zero as a weight in the weighting section 214-3-1 for the concave edge. Conversely, when the polarity determined by the determining portion 262-3 is negative, the setting portion 261-3 outputs the normalized detection result output by the dividing section 242-3 to the weighting section 214-3-2 for the concave edge, and sets zero as a weight in the weighting section 214-3-1 for the convex edge. When the polarity determined by the determining portion 262-4 is positive, the setting portion 261-4 sets the normalized detection result output by the dividing section 242-4 in the weighting section 214-4-1 for the convex edge, and sets zero as a weight in the weighting section 214-4-2 for the concave edge. When the determined polarity is negative, the setting portion 261-4 sets the normalized detection result output by the dividing section 242-4 in the weighting section 214-4-2, and sets zero as a weight in the weighting section 214-4-1 for the convex edge.

The weighting section 214-1-1 for the convex edge weights the data from the input unit 211 to have the weight output set by the setting portion 261-1, and outputs the weighted data to the prediction coefficient convolution section 215-1-1. The weighting section 214-1-2 for the concave edge weights the data from the input unit 211 to have the weight set by the setting portion 261-1, and outputs the weighted data to the prediction coefficient convolution section 215-1-2 for the concave edge. The weighting section 214-2-1 for the convex edge weights the data from the input unit 211 to have the weight set by the setting portion 261-2, and outputs the weighted data to the prediction coefficient convolution section 215-2-1 for the concave edge. The weighting section 214-2-2 for the concave edge weights the data from the input unit 211 to have the weight set by the setting portion 261-2, and outputs the weighted data to the prediction coefficient convolution section 215-2-2 for the concave edge.

The weighting section 214-3-1 for the convex edge weights the data from the input unit 211 to have the weight set by the setting portion 261-3, and outputs the weighted data to the prediction coefficient convolution section 215-3-1 for the convex edge. The weighting section 214-3-2 for the concave edge weights the data from the input unit 211 to have the weight set by the setting portion 261-3, and outputs the weighted data to the prediction coefficient convolution section 215-3-2. The weighting section 214-4-1 for the convex edge weights the data from the input unit 211 to have the weight set by the setting portion 261-4, and outputs the weighted data to the prediction coefficient convolution section 215-4-1 for the convex edge. The weighting section 214-4-2 for the concave edge weights the data from the input unit 211 to have the weight set by the setting portion 261-4, and outputs the weighted data to the prediction coefficient convolution section 215-4-2 for the concave edge.

In other words, the above edge detecting sections 231-1 to 231-4, absolute value calculating sections 241-1 to 241-4, dividing sections 242-1 to 242-4, adder section 243, setting portions 261-1 to 261-4, determining portions 262-1 to 262-4, and weighting sections 214-1-1 to 214-4-2 are similar in function and configuration to those having corresponding names in FIGS. 2 and 3.

The storage section 216-1-1 to 216-4-2 store the values stored in the storage section 30-1 to 30-4 shown in FIG. 2.

By using the prediction coefficient read from the storage section 216-1-1, the prediction coefficient convolution section 215-1-1 for the convex edge convolutes the data output by the weighting section 214-1-1, and outputs the resultant data (data of an image having a high resolution corresponding to the resolution of the teacher image output from the input unit 21 in FIG. 1) to the adder section 217. By using the prediction coefficient read from the storage section 216-1-2, the prediction coefficient convolution section 215-1-2 for the concave edge convolutes the data output from the weighting section 214-1-2, and outputs the resultant data to the adder section 217.

By using the prediction coefficient for the convex edge read from the storage section 216-2-1, the prediction coefficient convolution section 215-2-1 for the convex edge convolutes the data from the weighting section 214-2-1, and outputs the resultant data to the adder section 217. By using the prediction coefficient read from the storage section 216-2-2, the prediction coefficient convolution section 215-2-2 for the concave edge convolutes the data from the weighting section 214-2-2, and outputs the resultant data to the adder section 217.

By using the prediction coefficient read from the storage section 216-3-1, the prediction coefficient convolution section 215-3-1 for the convex edge convolutes the data from the weighting section 214-3-1, outputs the resultant data to the adder section 217. By using the prediction coefficient read from the storage section 216-3-2, the prediction coefficient convolution section 215-3-2 for the concave edge convolutes the data from the weighting section 214-3-2, and outputs the resultant data to the adder section 217. By using the prediction coefficient read from the storage section 216-4-1, the prediction coefficient convolution section 215-4-1 for the convex edge convolutes the data from the weighting unit 214-4-1, and outputs the resultant data to the adder section 217. Similarly, by using the prediction coefficient read from the storage section 216-4-2, the prediction coefficient convolution section 215-4-2 for the concave edge convolutes the data from the weighting section 214-4-2, and outputs the resultant data to the adder section 217.

The adder section 217 adds the data output from the prediction coefficient convolution sections 215-1-1 to 215-4-2, and outputs the obtained sum (data of an image having a high resolution corresponding to the resolution of the teacher image) to the output unit 218. The output unit 218 outputs the sum (image data) output by the adder section 217 to an apparatus (not shown) in which the sum is displayed and recorded.

Figure 12:
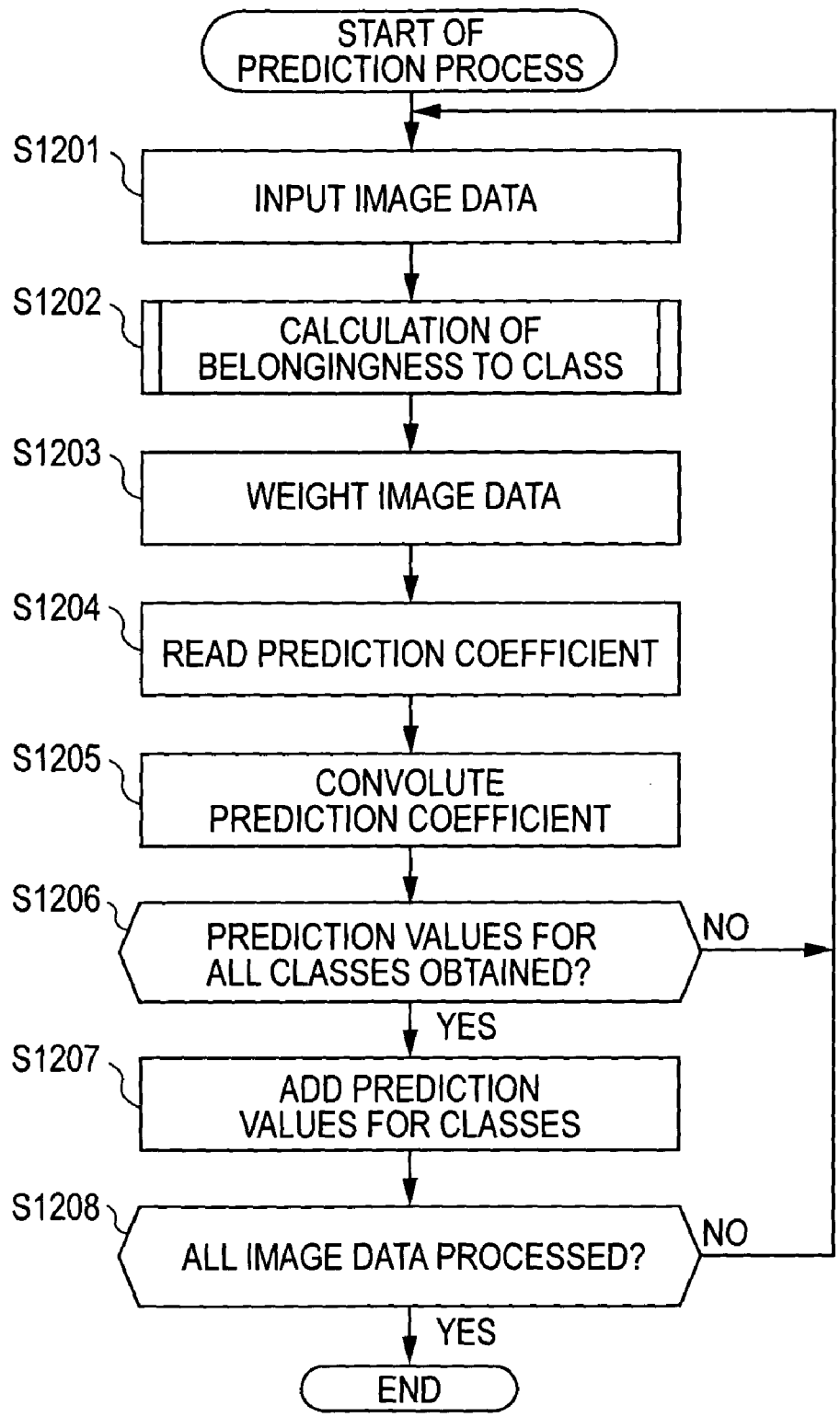
FIG. 12 is a flowchart illustrating a prediction process of the image processing apparatus shown in FIG. 11.

Next, the prediction process (process that predicts and generates a high resolution image from a low resolution image) of the image processing apparatus 201 is described below with reference to the flowchart shown in FIG. 12.

In step S1201, the input unit 211 receives the image data. In step S1202, the edge-class belongingness calculator 212 executes a class-belongingness calculating process. The class-belongingness calculating process is similar to that described with reference to the flowchart shown in FIG. 6. Accordingly, its description is omitted. In step S1202, weights in accordance with the degrees of belongingness of the image to the classes are set in the weighting sections 214-1-1 to 214-4-2.

In step S1203, the weighting sections 214-1-1 to 214-4-2 weight the image data. In other words, the weighting sections 214-1-1 to 214-4-2 weight items of the image data from the input unit 211 to have the weights set by the setting portions 261-1 to 261-4, and outputs the weighted items of the image data to the prediction coefficient convolution sections 215-1-1 to 215-4-2.

In step S1204, the prediction coefficient convolution sections 215-1-1 to 215-4-2 read the prediction coefficients from the corresponding storage sections 216-1-1 to 216-4-2. In step S1205, the prediction coefficient convolution sections 215-1-1 to 215-4-2 convolute the prediction coefficients. Specifically, in the above-described expressions (1) to (4), by replacing x with the pixel values of the input image, and replacing W with the prediction coefficients, prediction values y are obtained as the pixel values of the teacher image.

In step S1206, the prediction coefficient convolution sections 215-1-1 to 215-4-2 determine whether the prediction coefficients for all the classes have been obtained. If the prediction coefficients for all the classes have not been obtained, the process returns to step S1201 and repeatedly executes the subsequent steps. If, in step S1206, it is determined that the prediction coefficients for all the classes have been obtained, in step S1207, the adder section 217 adds the prediction values for the classes. Specifically, the prediction values output from the prediction coefficient convolution sections 215-1-1 to 215-4-2 are added. In step S1208, the adder section 217 determines whether all the image data has been processed. If all the image data has not been processed yet, the process returns to step S1201 and repeatedly executes the subsequent steps. If, in step S1208, it is determined that all the image data has been processed, the process ends.

Figure 14A:
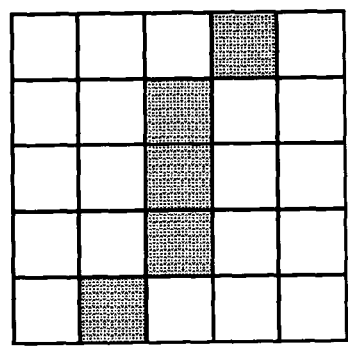
FIG. 14A is an illustration of an example of an edge.
Figure 14B:
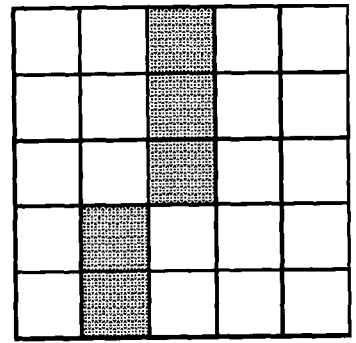
FIG. 14B is an illustration of another example of the edge.

FIGS. 13A to 13D show examples of edge detecting operators formed by 5×5 taps. FIG. 13A shows a horizontal edge detecting operator. FIG. 13B shows a vertical edge detecting operator. FIG. 13c shows a 45-degree-upward-sloping edge detecting operator. FIG. 13D shows a 45-degree-downward-sloping edge detecting operator. By expanding the tap ranges as described above, more extensive information can be acquired. However, as shown in FIGS. 14A and 14B, also slight edges (even in a case having a possibility of no edges) are classified as vertical edges, so that it is difficult to learn a minute change in image. As a result, class mixing occurs in a pattern classified as a vertical edge.

However, even if the tap size of an operator is changed to a greater value as in a case from a 3×3 tap to a 5×5 tap, the number of classes does not increase as in the case of classification with one-bit adaptive dynamic range coding (ADRC), thus enabling the number of classes to be maintained in a range capable of hardware formation.

In the above manner, the number of classes can be reduced, even if an operator having an arbitrary tap size is used when performing classification. Since the classification to the classes is represented by the degree of belongingness, all the input data becomes utilized for learning, thus eliminating a problem in that an increase in the number of classes causes insufficiency of learning data. For one input data item, a plurality of prediction sections perform prediction. Thus, variance of prediction errors is eliminated, so that improvement (improved image quality) in prediction accuracy can be expected. In addition, the image quality of a visually important portion such as an edge of an image can be improved.

Although, in the above description, edge detecting operators are used to detect edges, the edges can also be detected by using a two-dimensional wavelet function.

The two-dimensional wavelet function is represented by the following expression. At first, waves that oscillate in an x-direction on a two-dimensional plane are considered. The waves are represented by the following expression:

$$\exp(i\omega x) = \cos(\omega x) - i\sin(\omega x) \quad (7)$$

where $\omega$ represents a frequency, and i represents an imaginary unit.

Next, a two-dimensional Gaussian window is provided.

$$g_\sigma(x, y) = \frac{1}{4\pi\sigma} \exp^{\frac{-1}{4\sigma^2}(x^2+y^2)} \quad (8)$$

where $\sigma$ represents the width of a Gaussian window.

By rotating the waves by $\theta$ around the origin, and multiplying the waves by the Gaussian window, a Gabor-wavelet function can be obtained as represented as follows:

$$\Psi(x, y, \theta) = g_\sigma(x_r, y_r)\exp(i\omega x_r) \quad (9)$$

$$\begin{pmatrix} x_r \\ y_r \end{pmatrix} = \begin{pmatrix} \cos\theta & \sin\theta \\ -\sin\theta & \cos\theta \end{pmatrix} \begin{pmatrix} x \\ y \end{pmatrix} \quad (10)$$

Graphs obtained by plotting the real part of the function when $\omega=1$ are shown in FIGS. 15 to 19.

By selecting appropriate $\sigma$ and $\theta$ and performing convolution with the image, a feature quantity of a local edge component can be obtained similarly to a differential edge operator. The symbol $\sigma$ represents the thickness of the edge component, and $\theta$ represents the orientation of the edge component.

For example, by making filters based on conditions in which $\sigma=0.1$ and $\theta=0$, 30, 60, 90, 120, and 150 (degrees), edges that have two thicknesses can be detected in six directions. Based on values obtained by convolution with the image, the degrees of belongingness to the classes can be obtained.

Although, in the above embodiment, learning and prediction are performed by different apparatuses, the learning and prediction may be performed by a single apparatus.

Figure 15:
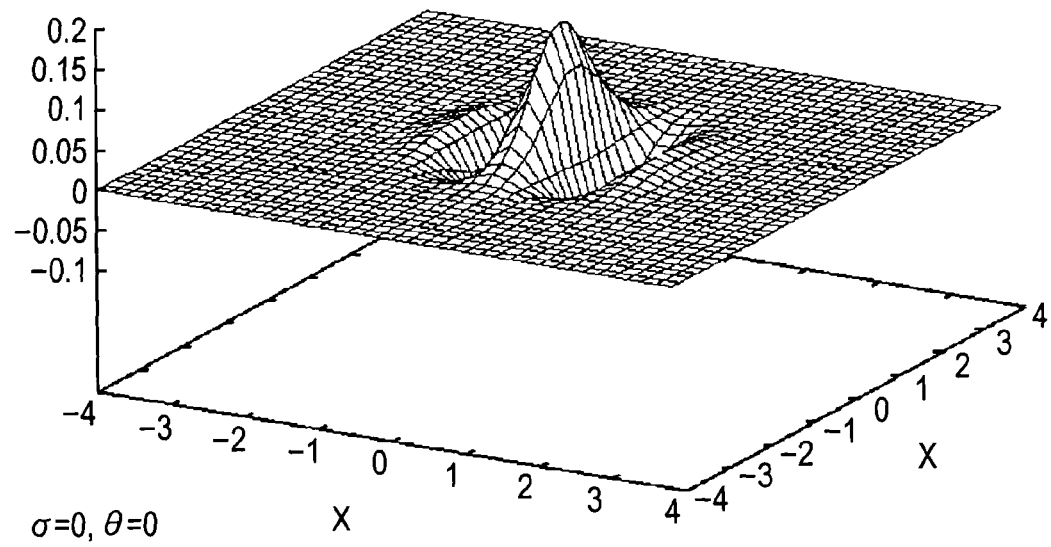
FIG. 15 is a graph showing an example of a wavelet function.
Figure 16:
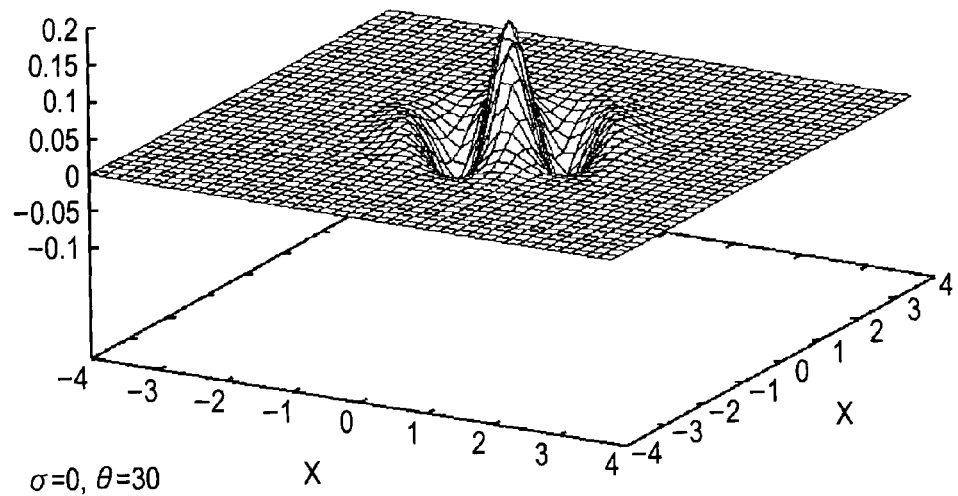
FIG. 16 is a graph showing an example of a wavelet function.
Figure 17:
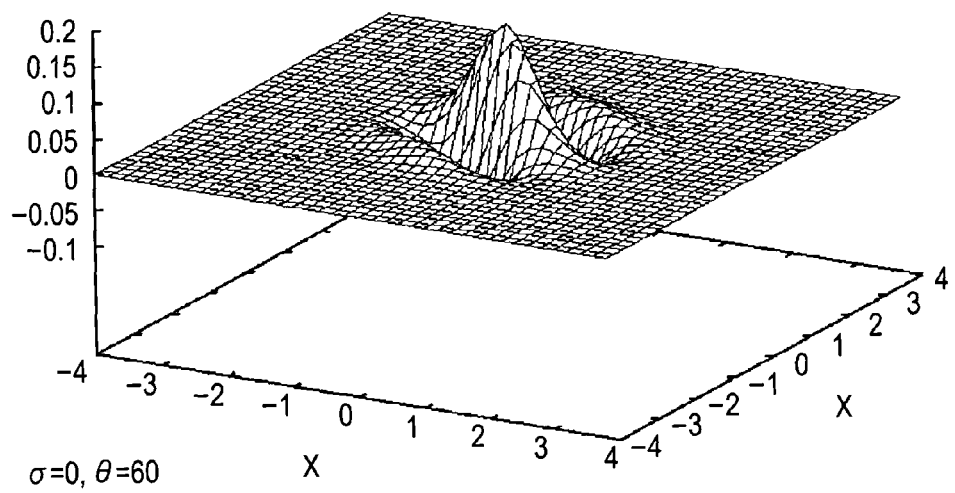
FIG. 17 is a graph showing an example of a wavelet function.
Figure 18:
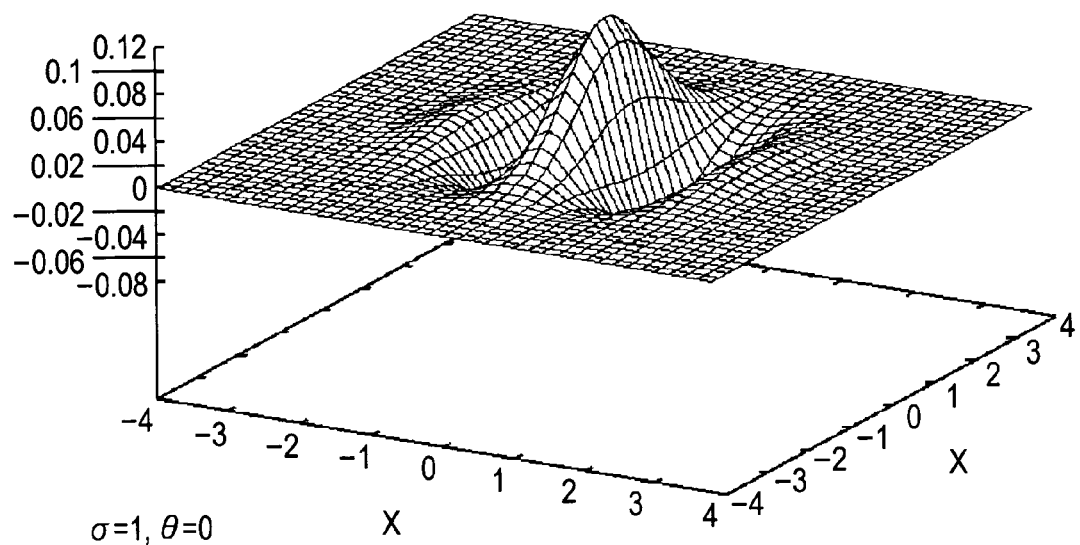
FIG. 18 is a graph showing an example of a wavelet function.
Figure 19:
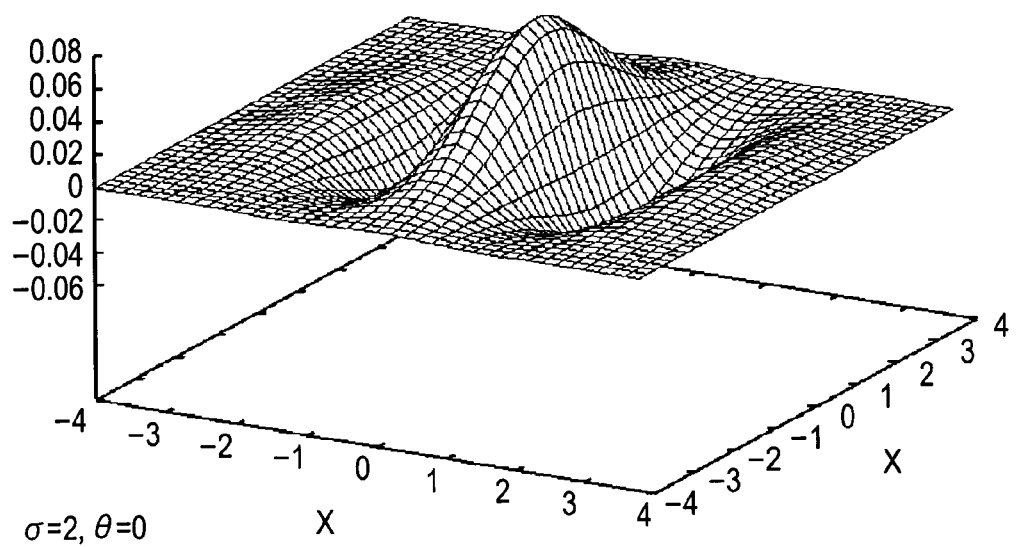
FIG. 19 is a graph showing an example of a wavelet function.

FIG. 15 shows a case in which $\sigma=0$ and $\theta=0$. FIG. 16 shows a case in which $\sigma=0$ and $\theta=30$. FIG. 17 shows a case in which σ=0 and θ=60. FIG. 18 shows a case in which σ=1 and θ=0. FIG. 19 shows a case in which σ=2 and θ=0.

By using wavelet transformation to extract a feature quantity, the width of an edge and its rotating direction can be flexibly detected.

The above consecutive processing may be executed either by hardware or by software. In the case of using software to execute the consecutive processing, programs that form the software are installed from a network or a recording medium into a built-in computer of dedicated hardware, or an apparatus (e.g., a personal computer) that can execute various functions by installing various types of programs.

In addition, in this specification, steps constituting a program recorded in a recording medium definitely include steps that are performed in a time-series manner in given order, and also include steps which are executed in parallel or separately even if the steps are not necessarily executed in a time-series manner.

Furthermore, in this specification, the system represents the entirety of a set of plural apparatuses.

According to an embodiment of the present invention, image processing can be performed. In particular, prediction coefficients based on which high quality image processing can be performed can be obtained while suppressing an increase in the number of classes.

In addition, according to an embodiment of the present invention, high quality image processing can be performed without increasing the number of classes.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a feature detecting unit configured to detect features of image information for a plurality of classes, the image information being input for learning;
a belongingness calculating unit configured to calculate degree of belongingness values for each of the detected features with respect to each of the classes;
a weighting unit configured to weight pieces of the input image information directly with the calculated degree of belongingness values; and
a prediction coefficient calculating unit configured to calculate prediction coefficients for the classes based on the weighted pieces of the image information.

2. An image processing apparatus, comprising:
a feature detecting unit configured to detect features of image information for a plurality of classes, the image information being input for learning, the feature detecting unit detecting a feature of a first image-information portion in the input image information;
a belongingness calculating unit configured to calculate degrees of belongingness of the detected features to the classes, the belongingness calculating unit calculating the degrees of belongingness of the feature of the first image-information portion to the classes;
a weighting unit configured to weight pieces of the input image information the weighting unit weighting the first image-information portion and a second image-information portion in the input image information based on the calculated degrees of belongingness, the second image-information portion representing image quality higher than image quality represented by the first image-information portion; and a prediction coefficient calculating unit configured to calculate prediction coefficients for the classes based on the weighted pieces of the image information, the prediction coefficient calculating unit calculating the prediction coefficients for the classes by solving sum matrices to each of which the weighted first and second image-information portions are added.

3. The image processing apparatus according to claim 1, wherein the feature detecting unit detects, as the features of the image information for the classes, edge components of the image information in a plurality of predetermined directions.

4. The image processing apparatus according to claim 3, wherein the feature detecting unit detects the edge components by convoluting edge detecting operators for the directions with the image information.

5. An image processing apparatus comprising:
a feature detecting unit configured to detect features of image information for a plurality of classes, the image information being input for learning;
a belongingness calculating unit configured to calculate the degrees of belongingness of the detected features to the classes;
a weighting unit configured to weight pieces of the input image information based on the degrees of belongingness;
a prediction coefficient calculating unit configured to calculate prediction coefficients for the classes based on the weighted pieces of the image information; and
a determination setting unit configured to determine the polarities of the detected edge components, and in which, based on the determined polarities, weights based on the degrees of belongingness are set as weights for, among said plurality of classes, a group of classes corresponding to the edge detecting operators, and zeroes are set as weights for another group of classes,
wherein the feature detecting unit detects, as the features of the image information for the classes, edge components of the image information in a plurality of predetermined directions, and the feature detecting unit detects the edge components by convoluting edge detecting operators for the directions with the image information.

6. The image processing apparatus according to claim 3, wherein the feature detecting unit detects the edge components by convoluting, with the image information, a two-dimensional wavelet function having a plurality of different parameters set therein.

7. The image processing apparatus according to claim 3, wherein the feature detecting unit detects the edge components in four directions which are used as the predetermined directions and which include a horizontal direction, a vertical direction, a 45-degree upward-sloping direction, and a 45-degree downward-sloping direction.

8. The image processing apparatus according to claim 3, wherein the belongingness calculating unit comprises:
an absolute value calculating unit which calculates the absolute values of the edge components;
a summation calculating unit which calculates the sum of the absolute values of the edge components; and
a division unit which divides each of the edge components by the calculated sum.

9. The image processing apparatus according to claim 1, further comprising a storage unit for storing the prediction coefficients.

10. An image processing method for causing an image processing apparatus to obtain high quality image information, the method comprising:

detecting, in a data processor, features of image information for a plurality of classes, the image information being input for learning;

calculating, in the data processor, degree of belongingness values for each of the detected features with respect to each of the classes;

weighting, in the data processor, pieces of the input image information directly with the calculated degree of belongingness values; and calculating, in the data processor, prediction coefficients for the classes based on the weighted pieces of the image information.

11. A non-transitory computer-readable medium storing computer-readable instructions thereon, the computer readable instructions when executed by a computer cause the computer to perform the method comprising:

detecting features of image information for a plurality of classes, the image information being input for learning;

calculating degree of belongingness values for each of the detected features with respect to each of the classes;

weighting pieces of the input image information directly with the calculated degree of belongingness values; and calculating prediction coefficients for the classes based on the weighted pieces of the image information.

12. An image processing apparatus comprising:

a feature detecting unit configured to detect features of input image information for a plurality of classes;

a belongingness calculating unit configured to calculate degree of belongingness values for each of the detected features with respect to each of the classes;

a weighting unit configured to weight pieces of the input image information directly with the calculated degree of belongingness values;

a providing unit configured to provide prediction coefficients for the classes; and a predictive-image-information calculating unit configured to calculate pieces of predictive image information for the classes by convolving the weighted pieces of the image information with the provided prediction coefficients for the classes; and an adder unit configured to add the pieces of the predictive image information for the classes.

13. The image processing apparatus according to claim 12, wherein the feature detecting unit detects, as the features of the image information for the classes, edge components of the image information in a plurality of predetermined directions.

14. The image processing apparatus according to claim 13, wherein the feature detecting unit detects the edge components by convoluting edge detecting operators for the directions with the image information.

15. An image processing apparatus comprising:

a feature detecting unit configured to detect features of input image information for a plurality of classes;

a belongingness calculating unit configured to calculate the degrees of belongingness of the detected features to the classes;

a weighting unit configured to weight pieces of the input image information based on the degrees of belongingness;

a providing unit configured to provide prediction coefficients for the classes; and a predictive-image-information calculating unit configured to calculate pieces of predictive image information for the classes on the basis of the weighted pieces of the image information and the provided prediction coefficients for the classes;

an adder unit configured to add the pieces of the predictive image information for the classes; and a determination setting unit configured to determine the polarities of the detected edge components, and in which, based on the determined polarities, weights based on the degrees of belongingness are set as weights for, among said plurality of classes, a group of classes corresponding to the edge detecting operators, and zeroes are set as weights for another group of classes, wherein the feature detecting unit detects, as the features of the image information for the classes, edge components of the image information in a plurality of predetermined directions, and the feature detecting unit detects the edge components by convoluting edge detecting operators for the directions with the image information.

16. The image processing apparatus according to claim 13, wherein the feature detecting unit detects the edge components by convoluting, with the image information, a two-dimensional wavelet function having a plurality of different parameters set therein.

17. The image processing apparatus according to claim 13, wherein the feature detecting unit detects the edge components in four directions which are used as the predetermined directions and which include a horizontal direction, a vertical direction, a 45-degree upward-sloping direction, and a 45-degree downward-sloping direction.

18. The image processing apparatus according to claim 13, wherein the belongingness calculating unit comprises:

an absolute value calculating unit which calculates the absolute values of the edge components;

a summation calculating unit which calculates the sum of the absolute values of the edge components; and a division unit which divides each of the edge components by the calculated sum.

19. The image processing apparatus according to claim 12, wherein the providing unit stores the prediction coefficients beforehand.

20. An information processing method for causing an image processing apparatus to obtain high quality image information, the method comprising:

detecting, in a data processor, features of input image information for a plurality of classes;

calculating, in the data processor, degree of belongingness values for each of the detected features with respect to each of the classes;

weighting, in the data processor, pieces of the input image information directly with the calculated degree of belongingness values;

providing, in the data processor, prediction coefficients for the classes;

calculating, in the data processor, pieces of predictive image information for the classes by convolving the weighted pieces of the image information with the provided prediction coefficients for the classes; and adding, in the data processor, the pieces of predictive image information for the classes.

21. A non-transitory computer-readable medium storing computer-readable instructions thereon, the computer readable instructions when executed by a computer cause the computer to perform the method comprising:

detecting features of input image information for a plurality of classes;

calculating degree of belongingness values for each of the detected features with respect to the classes;

weighting pieces of the input image information directly with the calculated degree of belongingness values;

providing prediction coefficients for the classes;

calculating pieces of predictive image information for the classes by convolving the weighted pieces of the image information with the provided prediction coefficients for the classes; and adding the pieces of predictive image information for the classes.

22. An image processing apparatus comprising:

means for detecting features of image information for a plurality of classes, the image information being input for learning;

means for calculating degree of belongingness values for each of the detected features with respect to each of the classes;

means for weighting pieces of the input image information directly with the calculated degree of belongingness values; and means for calculating prediction coefficients for the classes based on the weighted pieces of the image information.

23. An image processing apparatus comprising:

means for detecting features of input image information for a plurality of classes;

means for calculating degree of belongingness values for each of the detected features with respect to each of the classes;

means for weighting pieces of the input image information directly with the calculated degree of belongingness values;

means for providing prediction coefficients for the classes;

means for calculating pieces of predictive image information for the classes by convolving the weighted pieces of the image information with the provided prediction coefficients for the classes; and means for adding the pieces of the predictive image information for the classes.

* * * * *